US008477734B2

(12) United States Patent
Sambhwani et al.

(10) Patent No.: US 8,477,734 B2
(45) Date of Patent: Jul. 2, 2013

(54) REPORTING OF ACK AND CQI INFORMATION IN A WIRELESS COMMUNICATION SYSTEM

(75) Inventors: Sharad Deepak Sambhwani, San Diego, CA (US); Wei Zeng, San Diego, CA (US); Yibo Jiang, San Diego, CA (US); Lu Yuan, Carlsbad, CA (US); Mehmet Yavuz, San Diego, CA (US); Pavan Kumar Vitthaladevuni, San Diego, CA (US); Bibhu P. Mohanty, San Diego, CA (US); Danlu Zhang, San Diego, CA (US); Aziz Gholmieh, Del Mar, CA (US); Arjun Bharadwaj, San Diego, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 644 days.

(21) Appl. No.: 12/410,154

(22) Filed: Mar. 24, 2009

(65) Prior Publication Data

US 2009/0245212 A1    Oct. 1, 2009

Related U.S. Application Data

(60) Provisional application No. 61/039,413, filed on Mar. 25, 2008, provisional application No. 61/049,993, filed on May 2, 2008, provisional application No. 61/058,771, filed on Jun. 4, 2008, provisional application No. 61/087,021, filed on Aug. 7, 2008, provisional application No. 61/087,589, filed on Aug. 8, 2008, provisional application No. 61/088,480, filed on Aug. 13, 2008, provisional application No. 61/091,120, filed on Aug. 22, 2008, provisional application No. 61/097,682, filed on Sep. 17, 2008.

(51) Int. Cl.
*H04W 4/00* (2009.01)
(52) U.S. Cl.
USPC ........... 370/332; 370/336; 370/338; 370/345; 455/452.2

(58) Field of Classification Search
None
See application file for complete search history.

(56) References Cited

U.S. PATENT DOCUMENTS

| 7,724,722 B2 * | 5/2010 | Seo et al. ............... 370/344 |
| 2002/0095560 A1 * | 7/2002 | Barth et al. ............... 711/169 |

(Continued)

FOREIGN PATENT DOCUMENTS

| EP | 1248485 A1 | 10/2002 |
| KR | 20030041766 A | 5/2003 |

(Continued)

OTHER PUBLICATIONS

International Search Report & Written Opinion—PCT/US2009/038281, International Searching Authority—European Patent Office—Aug. 6, 2009.

(Continued)

*Primary Examiner* — Chi H. Pham
*Assistant Examiner* — Shick Hom
(74) *Attorney, Agent, or Firm* — Charles Chesney

(57) ABSTRACT

Techniques for reporting acknowledgement (ACK) information and channel quality indication (CQI) information in a wireless communication system are described. A user equipment (UE) may be able to receive data from up to two cells with dual-cell operation. The UE may determine CQI information for a first cell, determine CQI information for a second cell, and send the CQI information for both cells on a feedback channel with a single channelization code. The UE may process a control channel from each cell and, if control information is received from the cell, may further process a data channel from the cell to receive data sent to the UE. The UE may determine ACK information for each cell based on processing results for the data and control channels from that cell. The UE may send the ACK information for both cells on the feedback channel with the single channelization code.

51 Claims, 13 Drawing Sheets

U.S. PATENT DOCUMENTS

| | | | |
|---|---|---|---|
| 2003/0039217 A1* | 2/2003 | Seo et al. | 370/318 |
| 2003/0185242 A1* | 10/2003 | Lee et al. | 370/491 |
| 2004/0058687 A1* | 3/2004 | Kim et al. | 455/452.2 |
| 2004/0264507 A1* | 12/2004 | Cho et al. | 370/480 |
| 2006/0056355 A1* | 3/2006 | Love et al. | 370/332 |
| 2006/0293008 A1* | 12/2006 | Hiraki et al. | 455/226.4 |
| 2007/0049210 A1 | 3/2007 | Usuda et al. | |
| 2007/0086406 A1* | 4/2007 | Papasakellariou | 370/343 |
| 2007/0183432 A1 | 8/2007 | Kim et al. | 370/400 |
| 2008/0207207 A1* | 8/2008 | Moe et al. | 455/439 |
| 2008/0227461 A1* | 9/2008 | Dayal et al. | 455/452.2 |
| 2009/0209256 A1* | 8/2009 | Nakashima et al. | 455/436 |

FOREIGN PATENT DOCUMENTS

| | | |
|---|---|---|
| KR | 20070108250 A | 11/2007 |
| RU | 2006130594 A | 2/2008 |
| WO | WO03044989 A1 | 5/2003 |
| WO | 03059002 | 7/2003 |
| WO | WO2006011841 A1 | 2/2006 |
| WO | WO2006105308 A2 | 10/2006 |
| WO | 2006126078 A2 | 11/2006 |
| WO | WO2006130742 | 12/2006 |
| WO | WO2007025971 A1 | 3/2007 |
| WO | WO07123375 | 11/2007 |
| WO | WO2008022329 | 2/2008 |

OTHER PUBLICATIONS

European Search Report—EP12197651—Search Authority—Hague—Feb. 14, 2013.

* cited by examiner

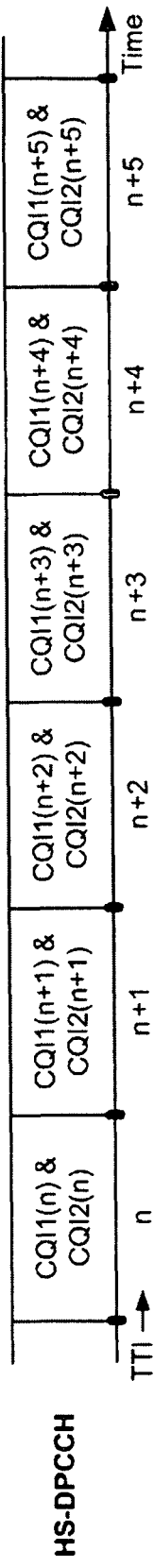
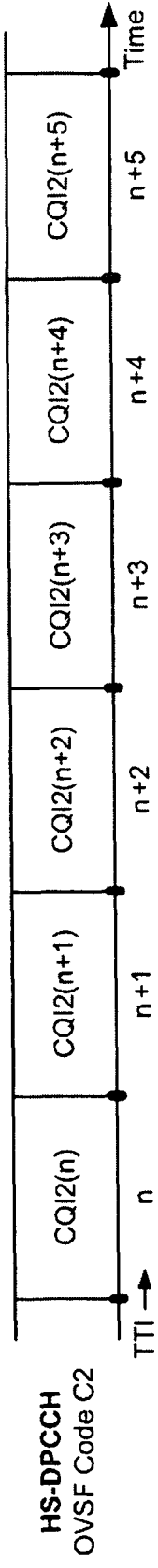
FIG. 4A
FIG. 4B

REPORTING OF ACK AND CQI INFORMATION IN A WIRELESS COMMUNICATION SYSTEM

The present application claims priority to the following provisional U.S. applications:

Ser. No. 61/039,413, entitled "METHOD AND APPARATUS FOR DUAL-CELL WIRELESS COMMUNICATIONS," filed Mar. 25, 2008;

Ser. No. 61/049,993, entitled "METHOD AND APPARATUS FOR DUAL-CELL WIRELESS COMMUNICATIONS," filed May 2, 2008;

Ser. No. 61/058,771, entitled "METHOD AND APPARATUS FOR DUAL-CELL WIRELESS COMMUNICATIONS," filed Jun. 4, 2008;

Ser. No. 61/087,021, entitled "DYNAMIC DOWNLINK CARRIER SWITCHING IN DUAL CELL-HSDPA USING A SINGLE HS-DPCCH ON THE UPLINK," filed Aug. 7, 2008;

Ser. No. 61/087,589, entitled "DYNAMIC DOWNLINK CARRIER SWITCHING IN DC-HSDPA USING A SINGLE HS-DPCCH ON THE UL," filed Aug. 8, 2008;

Ser. No. 61/088,480, entitled "DYNAMIC DOWNLINK CARRIER SWITCHING IN DUAL CELL-HSDPA USING A SINGLE HS-DPCCH ON THE UPLINK," filed Aug. 7, 2008, Ser. No. 61/091,120, entitled "DYNAMIC DOWNLINK CARRIER SWITCHING IN DUAL CELL-HSDPA USING A SINGLE HS-DPCCH ON THE UPLINK," filed Aug. 22, 2008; and Ser. No. 61/097,682, entitled "SINGLE CODE HS-DPCCH DESIGN FOR DC-HSDPA," filed Sep. 17, 2008.

All of the above provisional U.S. applications are assigned to the assignee hereof and incorporated herein by reference.

BACKGROUND

I. Field

The present disclosure relates generally to communication, and more specifically to techniques for reporting feedback information in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A Node B may transmit data to a UE. The UE may send channel quality indication (CQI) information indicative of the downlink channel quality to the Node B. The Node B may select a transport format based on the CQI information and may transmit data in accordance with the selected transport format to the UE. The UE may send acknowledgement (ACK) information for the data received from the Node B. The Node B may determine whether to retransmit the data or to transmit new data to the UE based on the ACK information. It is desirable to efficiently send ACK and CQI information in order to achieve good performance.

SUMMARY

Techniques for reporting ACK and CQI information in a wireless communication system are described herein. A UE may be able to receive data from up to two cells with dual-cell operation. The UE may send ACK and CQI information for the two cells in various manners.

In an aspect, ACK and CQI information for two cells may be sent on a feedback channel with a single channelization code. In one design, the UE may determine CQI information for a first cell, determine CQI information for a second cell, and send the CQI information for both cells on a feedback channel with a single channelization code. The UE may process a control channel from each cell and, if control information is received from that cell, may further process a data channel from the cell to receive data sent to the UE. The UE may determine ACK information for each cell based on processing results for the data and control channels from that cell. The UE may send the ACK information for both cells on the feedback channel with the single channelization code.

The UE may also receive data from more than two cells, from multiple carriers, multiple links, etc. The UE may send ACK and CQI information for multiple cells, multiple carriers, or multiple links in a manner similar to the design described above. The UE may also send ACK and CQI information in other manners, as described below. Various aspects and features of the disclosure are also described in further detail below.

BRIEF DESCRIPTION OF THE DRAWINGS

FIGS. 4A to 6B show various designs of sending CQI information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for WCDMA, and 3GPP terminology is used in much of the description below.

Figure 1:
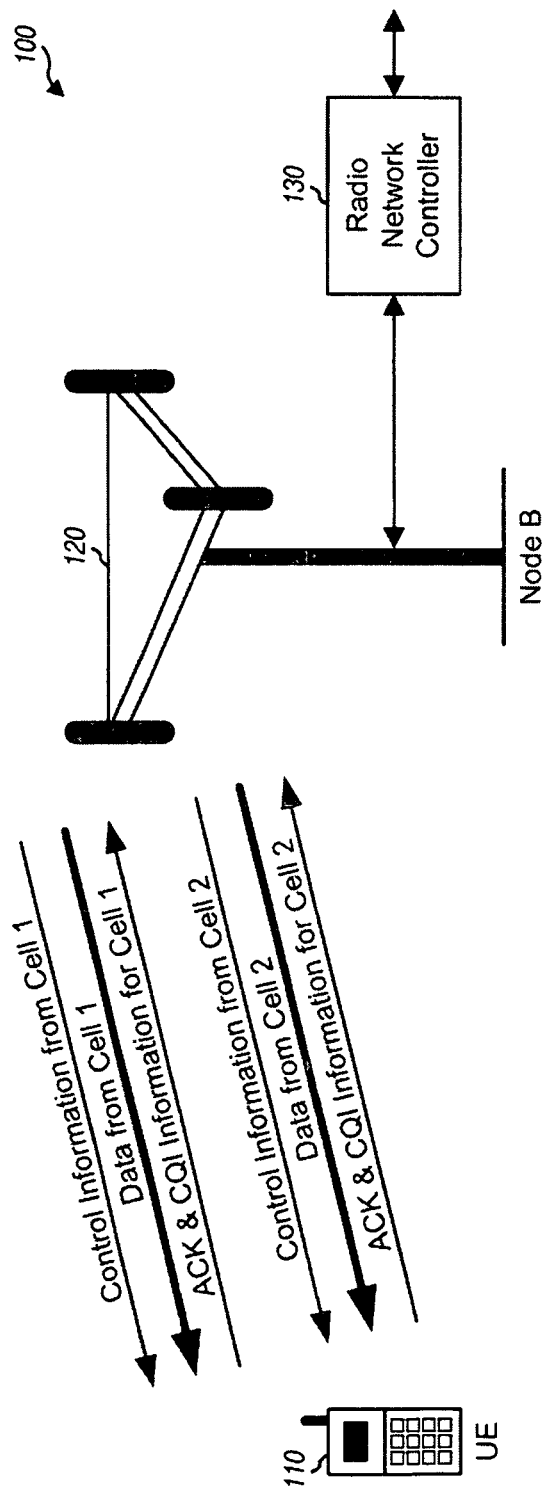
FIG. 1 shows a wireless communication system.

FIG. 1 shows a wireless communication system 100, which may include a number of Node Bs and other network entities. For simplicity, only one Node B 120 and one Radio Network Controller (RNC) 130 are shown in FIG. 1. A Node B may be a station that communicates with the UEs and may also be referred to as an evolved Node B (eNB), a base station, an access point, etc. A Node B may provide communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area, depending on the context in which the term is used. In 3GPP2, the term "sector" or "cell-sector" can refer to the smallest coverage area of a base station and/or a base station subsystem serving this coverage area. For clarity, 3GPP concept of "cell" is used in the description below. RNC 130 may couple to a set of Node Bs and provide coordination and control for these Node Bs.

A UE 110 may be one of many UEs dispersed throughout the system. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. UE 110 may communicate with Node B 120 via the downlink and uplink. The downlink (or forward link) refers to the communication link from Node B 120 to UE 110, and the uplink (or reverse link) refers to the communication link from UE 110 to Node B 120.

3GPP Release 5 and later supports High-Speed Downlink Packet Access (HSDPA), which is a set of channels and procedures that enable high-speed packet data transmission on the downlink. For HSDPA, a Node B may send data on a High Speed Downlink Shared Channel (HS-DSCH), which is a downlink transport channel that is shared by UEs in both time and code. The HS-DSCH may carry data for one or more UEs in each transmission time interval (TTI). The sharing of the HS-DSCH may be dynamic and may change from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |

TABLE 1-continued

| Link | Channel | Channel Name | Description |
| --- | --- | --- | --- |
| Downlink | HS-SCCH | Shared Control Channel for HS-DSCH | Carry control information for the HS-PDSCH. |
| Uplink | HS-DPCCH | Dedicated Physical Control Channel for HS-DSCH | Carry feedback information from the UEs. |

3GPP also supports Dual-Cell HSDPA (DC-HSDPA). For DC-HSDPA, up to two cells of a Node B may send data on the HS-DSCH to a UE in a given TTI. The two cells may operate on different carriers. Hence, the terms "cells" and "carriers" may be used interchangeable with regard to DC-HSDPA. In general, the techniques described herein may be used for data transmission on multiple links, which may correspond to different cells, different carriers, etc.

HSDPA and DC-HSDPA support hybrid automatic retransmission (HARQ). With HARQ, a Node B may send a transmission of a transport block to a UE and may send one or more additional transmissions, if needed, until the transport block is decoded correctly by the UE, or the maximum number of transmissions has been sent, or some other termination condition is encountered. A transport block may also be referred to as a packet, a codeword, a data block, etc. The UE may send ACK information after each transmission of the transport block to indicate whether the transport block was decoded correctly or in error. The Node B may determine whether to send another transmission of the transport block or to terminate transmission of the transport block based on the ACK information.

UE 110 may send ACK and CQI information for one cell in HSDPA. UE 110 may send ACK and CQI information for two cells in DC-HSDPA. It may be desirable to send ACK and CQI information in an efficient manner for DC-HSDPA.

In an aspect, ACK information for two cells in DC-HSDPA may be sent on the HS-DPCCH with a single channelization code. This may be referred to as "single-code HS-DPCCH", "single HS-DPCCH", etc. The single-code HS-DPCCH may provide good performance for DC-HSDPA.

Figure 2:
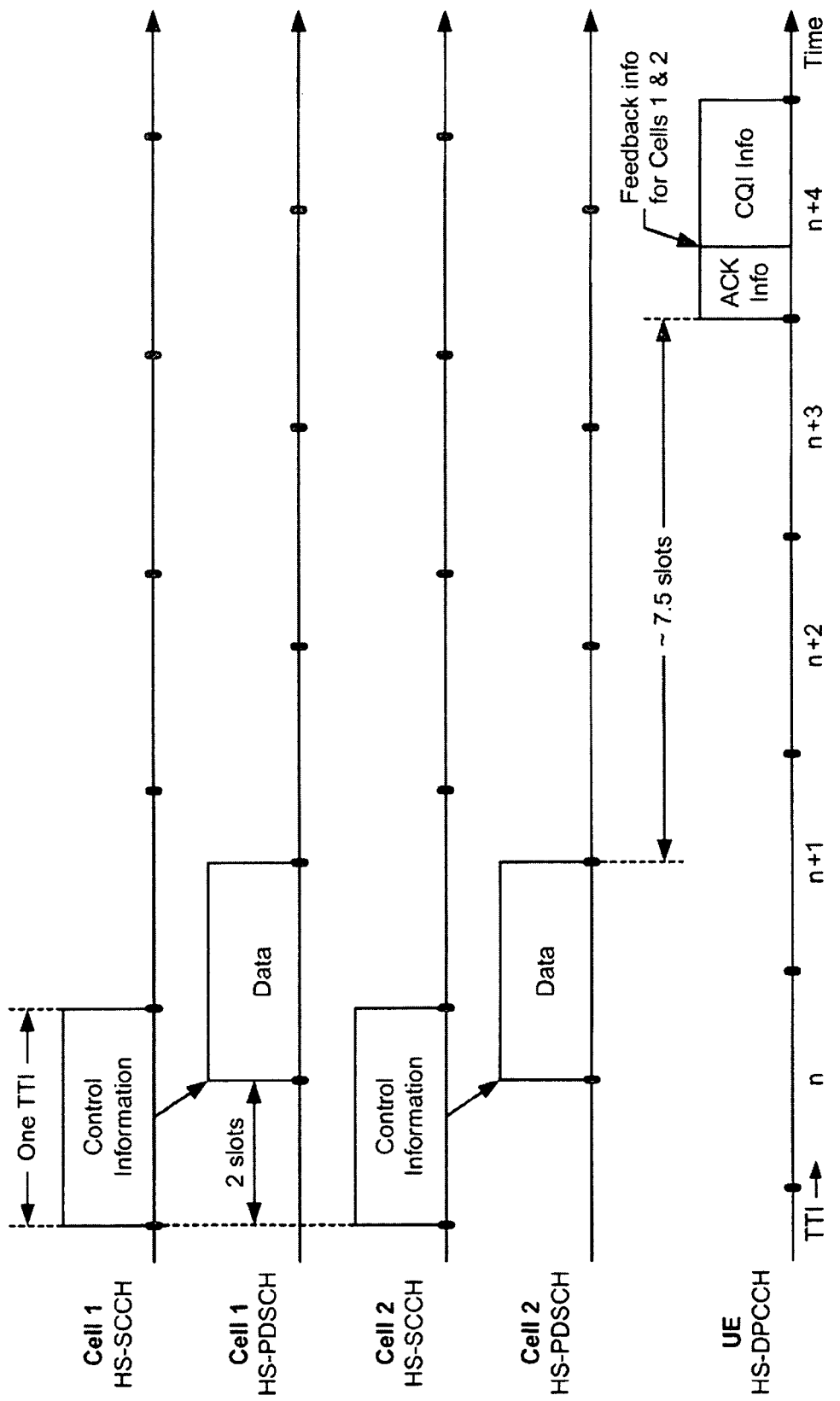
FIGS. 2 and 3 show data transmission from two cells with feedback information sent by a UE with one and two channelization codes, respectively.

FIG. 2 shows a design of data transmission in DC-HSDPA with a single-code HS-DPCCH. The transmission time line may be partitioned into units of radio frames, and each radio frame may have a duration of 10 millisecond (ms). For HSDPA, each radio frame may be partitioned into five subframes, each subframe may have a duration of 2 ms and may include three slots, and each slot may have a duration of 0.667 ms. A TTI may be equal to one subframe for HSDPA and may be the smallest unit of time in which a UE may be scheduled and served.

Node B 120 may support multiple (e.g., three) cells. Each cell may transmit the HS-SCCH and HS-PDSCH on the downlink to UEs served by that cell. Each cell may use up to fifteen 16-chip channelization codes with a spreading factor of 16 (SF=16) for the HS-PDSCH. Each cell may also use any number of 128-chip channelization codes with a spreading factor of 128 (SF=128) for the HS-SCCH. The channelization codes are orthogonal variable spreading factor (OVSF) codes that may be generated in a structured manner based on an OVSF code tree. The number of 16-chip channelization codes used for the HS-PDSCH and the number of 128-chip channelization codes used for the HS-SCCH may be configurable for each cell.

FIG. 2 shows the HS-SCCHs and HS-PDSCHs for two cells 1 and 2 and the HS-DPCCH for UE 110. The HS-SCCHs may be aligned to radio frame boundary. The HS-PDSCHs may start two slots after the HS-SCCHs. The HS-DPCCH may start approximately 7.5 slots from the end of a corresponding transmission on an HS-PDSCH.

Each cell may serve one or more UEs in each TTI. Each cell may send control information for the scheduled UEs on the HS-SCCH and may send data for the scheduled UEs on the HS-PDSCH two slots later. The control information may also be referred to as scheduling information, downlink signaling, etc. The control information may identify the scheduled UEs and a transport format selected for each scheduled UE. A transport format may indicate a modulation scheme, a transport block size, and a set of channelization codes used for data transmission to a UE. The HS-PDSCH may carry one transport block for each UE scheduled without multiple-input multiple-output (MIMO) and one or two transport blocks for each UE scheduled with MIMO.

UE 110 may be configured for DC-HSDPA operation and may receive data from up to two cells in a TTI. In each TTI, UE 110 may process the HS-SCCHs from cells 1 and 2 to determine whether control information has been sent to the UE. For each cell from which control information has been received on the HS-SCCH, UE 110 may process the HS-PDSCH from that cell to recover a transport block sent to UE 110. UE 110 may determine ACK information for the transport blocks, if any, received from the two cells. The ACK information may comprise an ACK or a negative acknowledgement (NACK) for each transport block, with the ACK indicating that the transport block was decoded correctly and the NACK indicating that the transport block was decoded in error. UE 110 may also estimate a signal-to-noise-and-interference ratio (SINR) for each cell and may determine CQI information based on the SINR estimates for both cells. UE 110 may send feedback information comprising the ACK and CQI information on the HS-DPCCH approximately 7.5 slots from the end of the corresponding transmissions on the HS-PDSCHs. The ACK information may be sent in one slot, and the CQI information may be sent in the following two slots, as shown in FIG. 2.

The ACK information for a given TTI may be represented by one of L possible values, where L>1. In one design, the L possible ACK values may be associated with L different codewords in a codebook. One codeword corresponding to the value of the ACK information may be sent on the HS-DPCCH to convey the ACK information.

In a first codebook design, a codebook of eight codewords may be used for ACK information for two cells in DC-HS-DPA. Each codeword may comprise ten code bits that may be processed and sent on the HS-DPCCH in one slot, as described below. Each code bit may have a binary value of either '1' or '−1' (or equivalently, a value of either '1' or '0', depending on the selected nomenclature).

Table 2 shows an exemplary design of a codebook with eight codewords for ACK information for two cells in DC-HSDPA. The eight codewords are given in the last eight rows of Table 2. The first two columns of Table 2 give the content of the ACK information for each codeword. The next ten columns give the ten code bits $w_0$ through $w_9$ for each codeword. As shown in Table 2, the first two codewords may be used to send ACK or NACK for a transport block received from cell 1 and discontinuous transmission (DTX) for cell 2. DTX may occur due to (i) cell 2 not scheduling UE 110 for data transmission or (ii) cell 2 scheduling UE 110 for data transmission but UE 110 decoding the HS-SCCH from cell 2 in error and thus skipping the HS-PDSCH. The next four codewords may be used to send ACK or NACK for a transport block from each of cells 1 and 2. The last two codewords may be used to send ACK or NACK for a transport block received from cell 2 and DTX for cell 1.

TABLE 2

Codebook for ACK Information for DC-HSDPA

| DC-HSDPA | | Code Bits | | | | | | | | | | MIMO | |
| --- | --- | --- | --- | --- | --- | --- | --- | --- | --- | --- | --- | --- | --- |
| Cell 1 | Cell 2 | $w_0$ | $w_1$ | $w_2$ | $w_3$ | $w_4$ | $w_5$ | $w_6$ | $w_7$ | $w_8$ | $w_9$ | Transport block 1 | Transport block 2 |
| ACK | DTX | −1 | −1 | −1 | −1 | −1 | −1 | −1 | −1 | −1 | −1 | ACK | DTX |
| NACK | DTX | 1 | 1 | 1 | 1 | 1 | 1 | 1 | 1 | 1 | 1 | NACK | DTX |
| ACK | ACK | −1 | 1 | −1 | 1 | −1 | −1 | −1 | −1 | 1 | −1 | ACK | ACK |
| ACK | NACK | −1 | −1 | 1 | −1 | 1 | −1 | 1 | −1 | −1 | −1 | ACK | NACK |
| NACK | ACK | 1 | −1 | −1 | −1 | −1 | 1 | −1 | 1 | −1 | −1 | NACK | ACK |
| NACK | NACK | −1 | 1 | 1 | −1 | 1 | 1 | −1 | 1 | 1 | 1 | NACK | NACK |
| DTX | ACK | 1 | 1 | −1 | 1 | 1 | −1 | 1 | 1 | −1 | 1 | PRE | |
| DTX | NACK | 1 | −1 | 1 | 1 | −1 | 1 | 1 | −1 | 1 | 1 | POST | |

The first codebook design for DC-HSDPA shown in Table 2 reuses the codebook used for MIMO. This may simplify implementation of UE 110 and Node B 120. UE 110 may be configured for DC-HSDPA or MIMO operation. The codewords sent by UE 110 for ACK information may be interpreted differently depending on whether the UE is configured for DC-HSDPA or MIMO. In particular, the codewords may be interpreted (i) as shown by the first two column of Table 2 when UE 110 is configured for DC-HSDPA or (ii) as shown by the last two columns of Table 2 when UE 110 is configured for MIMO. In Table 2, "PRE" denotes a codeword that may be sent as a preamble for the HS-DPCCH, and "POST" denotes a codeword that may be sent as a postamble for the HS-DPCCH.

In a second codebook design, a codebook of ten codewords may be used for ACK information for DC-HSDPA. Each codeword may comprise ten code bits, and each code bit may have a binary value of either '1' or '−1'.

Table 3 shows an exemplary design of a codebook with ten codewords for ACK information for two cells in DC-HSDPA. The first two codewords may be used to send ACK or NACK for a transport block received from cell 1 and DTX for cell 2. The next four codewords may be used to send ACK or NACK for a transport block from each of cells 1 and 2. The next two codewords may be used to send ACK or NACK for a transport block received from cell 2 and DTX for cell 1. The last two codewords may be used for PRE and POST.

TABLE 3

Another Codebook for ACK Information for DC-HSDPA

| DC-HSDPA | | Code Bits | | | | | | | | | | MIMO | |
|---|---|---|---|---|---|---|---|---|---|---|---|---|---|
| Cell 1 | Cell 2 | $w_0$ | $w_1$ | $w_2$ | $w_3$ | $w_4$ | $w_5$ | $w_6$ | $w_7$ | $w_8$ | $w_9$ | Transport block 1 | Transport block 2 |
| ACK | DTX | -1 | -1 | -1 | -1 | -1 | -1 | -1 | -1 | -1 | -1 | ACK | DTX |
| NACK | DTX | 1 | 1 | 1 | 1 | 1 | 1 | 1 | 1 | 1 | 1 | NACK | DTX |
| ACK | ACK | -1 | 1 | -1 | 1 | -1 | -1 | -1 | -1 | 1 | -1 | ACK | ACK |
| ACK | NACK | -1 | -1 | 1 | -1 | 1 | -1 | 1 | -1 | -1 | -1 | ACK | NACK |
| NACK | ACK | 1 | -1 | -1 | -1 | -1 | 1 | -1 | 1 | -1 | -1 | NACK | ACK |
| NACK | NACK | -1 | 1 | 1 | -1 | 1 | 1 | -1 | 1 | 1 | 1 | NACK | NACK |
| DTX | ACK | 1 | -1 | -1 | -1 | 1 | -1 | -1 | -1 | 1 | 1 | — | |
| DTX | NACK | -1 | -1 | 1 | 1 | -1 | -1 | -1 | 1 | -1 | 1 | — | |
| PRE | | 1 | 1 | -1 | 1 | 1 | -1 | 1 | 1 | -1 | 1 | PRE | |
| POST | | 1 | -1 | 1 | 1 | -1 | 1 | 1 | -1 | 1 | 1 | POST | |

The codebook design for DC-HSDPA in Table 3 reuses the eight codewords in the MIMO codebook and further includes two additional codewords for the case in which a transport block is received from cell 2 and DTX is obtained for cell 1. This may simplify implementation of UE 110 and Node B 120.

Tables 2 and 3 show designs of two exemplary codebooks for ACK information for two cells in DC-HSDPA. In general, a codebook with any number of codewords may be used for ACK information for DC-HSDPA. The number of codewords may be dependent on the number of possible values for the ACK information. Each codeword may comprise any suitable sequence/vector of bits. Some or all of the codewords for DC-HSDPA may be taken from the codebook for MIMO, as described above, which may simplify UE and Node B implementation. Alternatively, the codewords for DC-HSDPA may be defined independently of the codewords for MIMO in order to achieve good performance, e.g., to maximize the distance between the codewords for DC-HSDPA. Different codebooks may thus be used for DC-HSDPA and MIMO.

In another design, ACK information for two cells in DC-HSDPA may be sent on different branches of the HS-DPCCH with a single channelization code. ACK information for each cell may be generated separately, e.g., based on a codebook shown in Table 4 below. The ACK information for cell 1 may be sent on one branch (either an inphase (I) branch or a quadrature (Q) branch) of the HS-DPCCH with the single channelization code. The ACK information for cell 2 may be sent on the other branch of the HS-DPCCH with the same channelization code. The mapping of cells 1 and 2 to the two branches and the selection of a suitable channelization code may be such that good detection performance can be achieved by Node B 120. In one design, ACK information for the two cells may be sent as follows:

Send ACK information for cell 1 on Q branch with channelization code Cch,256,33, Send ACK information for cell 2 on I branch with channelization code Cch,256,33, where '256' denotes the spreading factor, and '33' denotes the OVSF code number.

Channelization codes Cch,256,1, Cch,256,33 and Cch, 256,64 are reserved for the HS-DPCCH. Hence, the design described above uses a channelization code that may be assigned for the HS-DPCCH, which may then simplify processing at UE 110 and Node B 120. The ACK information for the two cells may also be mapped to I and Q branches of the HS-DPCCH in other manners and/or sent with other channelization codes.

In another aspect, ACK information for two cells in DC-HSDPA may be sent on the HS-DPCCH with one channelization code for each cell. This may be referred to as "dual-code HS-DPCCH", "dual HS-DPCCHs", "two HS-DPCCHs", etc. The dual-code HS-DPCCH may simplify operation of UE 110 and Node B 120.

Figure 3:
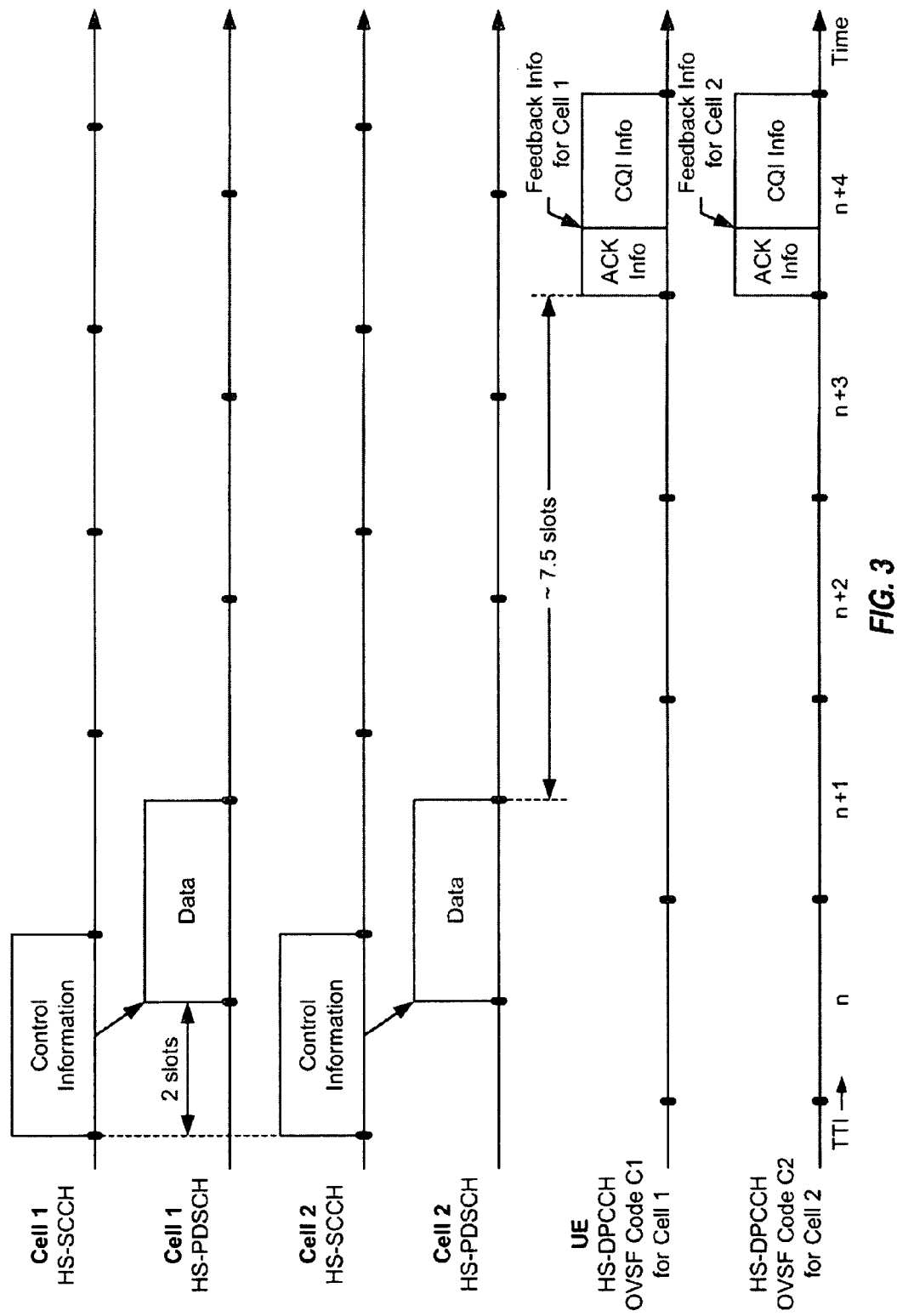

FIG. 3 shows a design of data transmission in DC-HSDPA with dual-code HS-DPCCH. UE 110 may be configured for DC-HSDPA operation and may be assigned a first channelization code C1 for the HS-DPCCH for cell 1 and a second channelization code C2 for cell 2. UE 110 may receive data from up to two cells in a TTI. In each TTI, UE 110 may process the HS-SCCHs from cells 1 and 2 to determine whether control information has been sent to the UE. If UE 110 receives control information from cell m, where m∈{1, 2}, then UE 110 may process the HS-PDSCH from cell m to recover the transport block sent to UE 110, determine ACK information for the transport block, and send the ACK information on the HS-DPCCH with channelization code Cm. The ACK information for each cell may comprise ACK, NACK, or DTX, depending on the decoding results for the HS-SCCH and HS-PDSCH from that cell. UE 110 may also send CQI information for each cell on the HS-DPCCH with the channelization code for the cell. UE 110 may thus send the ACK and CQI information for each cell independently on the HS-DPCCH with the channelization code for the cell. Each cell may detect for ACK and CQI information from UE 110 based on the channelization code for the cell.

Table 4 shows an exemplary design of a codebook with five codewords for ACK information for one cell. The first two codewords may be used to send ACK or NACK for a transport block received from the cell. The third codeword may be used to denote DTX for the cell. The last two codewords may be used for PRE and POST.

TABLE 4

Codebook for ACK Information for One Cell in DC-HSDPA

| ACK Information | Code Bits | | | | | | | | | |
|---|---|---|---|---|---|---|---|---|---|---|
| | $w_0$ | $w_1$ | $w_2$ | $w_3$ | $w_4$ | $w_5$ | $w_6$ | $w_7$ | $w_8$ | $w_9$ |
| ACK | -1 | -1 | -1 | -1 | -1 | -1 | -1 | -1 | -1 | -1 |
| NACK | 1 | 1 | 1 | 1 | 1 | 1 | 1 | 1 | 1 | 1 |
| DTX | 0 | 0 | 0 | 0 | 0 | 0 | 0 | 0 | 0 | 0 |
| PRE | 1 | 1 | -1 | 1 | 1 | -1 | 1 | 1 | -1 | 1 |
| POST | 1 | -1 | 1 | 1 | -1 | 1 | 1 | -1 | 1 | 1 |

The codebook design shown in Table 4 may allow UE 110 and the cell to distinguish between NACK and DTX. The cell may resend a prior transmission of a transport block if DTX is received from UE 110 and may send another transmission of the transport block if a NACK is received. This may improve decoding performance at UE 110. In another codebook design, DTX is not supported, and UE 110 may send a NACK if control information is not received on the HS-SCCH and also if a transport block is decoded in error. The cell may either resend the prior transmission or send another transmission of the transport block if a NACK is received.

In one design, ACK information for the two cells may be sent as follows:

Send ACK information for cell 1 on Q branch with channelization code Cch,256,64,
Send ACK information for cell 2 on Q branch with channelization code Cch,256,1.

The ACK information for the two cells may also be sent on the I and/or Q branches of the HS-DPCCH in other manners and/or sent with other channelization codes.

The dual-code HS-DPCCH may be used for DC-HSDPA, as described above. The dual-code HS-DPCCH may also be used for a combination of DC-HSDPA and MIMO. In this case, each cell may transmit up to two transport blocks with MIMO to UE 110. UE 110 may generate ACK information for each cell based on the mapping shown in Table 2 or 3 and may send the ACK information on the HS-DPCCH with the channelization code for that cell.

In yet another aspect, CQI information for two cells in DC-HSDPA may be sent on the HS-DPCCH with a single channelization code. In one design, CQI information for each cell may comprise five bits, which may convey one of 31 CQI levels 0 through 30. Ten bits of CQI information for two cells may be encoded with a (20, 10) block code to obtain 20 code bits, which may be sent on the HS-DPCCH in two slots.

Table 5 shows a first CQI mapping design. Ten information bits may be sent on the HS-DPCCH and may be denoted as $a_0$ through $a_9$. Five bits of CQI information for cell 1 may be denoted as $cqi1_0$ through $cqi1_4$ and may be mapped to information bits $a_0$ through $a_4$, respectively. Five bits of CQI information for cell 2 may be denoted as $cqi2_0$ through $cqi2_4$ and may be mapped to information bits $a_5$ through $a_9$, respectively. $cqi1_0$ and $cqi2_0$ may be the least significant bits (LSBs) of the CQI information, and $cqi1_4$ and $cqi2_4$ may be the most significant bits (MSBs).

$$b_i = \sum_{k=0}^{9} (a_k \cdot M_{i,k}) \bmod 2, \text{ for } i = 0, \ldots, 19, \qquad \text{Eq (1)}$$

where
  $a_k$ denotes the k-th information bit,
  $b_i$ denotes the i-th code bit in the codeword,
  $M_{i,k}$ denotes the i-th bit in a basis sequence for the k-th information bit, and
  "mod" denotes a modulo operation.

The ten information bits may be associated with ten different basis sequences, with each basis sequence including 20 bits. Each information bit $a_k$ may be encoded by multiplying $a_k$ with each bit $M_{i,k}$ of the basis sequence for that information bit to obtain an encoded basis sequence. Ten encoded basis sequences for the ten information bits may then be combined with modulo-2 addition to obtain a codeword composed of 20 code bits $b_0$ through $b_{19}$.

In one design, the block code used for PCI and CQI information for MIMO may be reused for CQI information for two cells in DC-HSDPA in order to simplify implementation. The basis sequences for the block code for MIMO are given in 3GPP TS 25.211, entitled "Physical channels and mapping of transport channels onto physical channels (FDD)," which is publicly available. Ideally, a block code should provide equal protection (e.g., equal bit error rate (BER)) for all information bits. However, computer simulations indicate that the block code for MIMO provides unequal protection for the ten information bits, with information bits $a_2$ and $a_6$ having the highest BERs and the other eight information bits having lower BERs.

Table 6 shows a second CQI mapping design. The second row of Table 6 shows the protection rank of each information bit, where rank 1 denotes the best protection and rank 10 denotes the worst protection. The five bits of CQI information for cell 1 may be mapped to the last five information bits $a_5$ through $a_9$, and the five bits of CQI information for cell 2 may be mapped to the first five information bits $a_0$ through $a_4$. For each cell, the five CQI bits may be mapped to five information bits such that progressively lesser significant CQI bits are mapped to information bits with progressively less protection. This may improve performance since more significant

TABLE 5

First Mapping of CQI Information to Information Bits

| | Info bits for HS-DPCCH | | | | | | | | | |
|---|---|---|---|---|---|---|---|---|---|---|
| | $a_0$ | $a_1$ | $a_2$ | $a_3$ | $a_4$ | $a_5$ | $a_6$ | $a_7$ | $a_8$ | $a_9$ |
| CQI info bits for cell 1 | $cqi1_0$ | $cqi1_1$ | $cqi1_2$ | $cqi1_3$ | $cqi1_4$ | | | | | |
| CQI info bits for cell 2 | | | | | | $cqi2_0$ | $cqi2_1$ | $cqi2_2$ | $cqi2_3$ | $cqi2_4$ |
| PCI/CQI info for MIMO | $pci_0$ | $pci_1$ | $cqi_0$ | $cqi_1$ | $cqi_2$ | $cqi_3$ | $cqi_4$ | $cqi_5$ | $cqi_6$ | $cqi_7$ |

Table 5 also shows the mapping of preceding control indication (PCI) and CQI information for MIMO to the ten information bits. The PCI information may comprise two bits $pci_0$ and $pci_1$, and the CQI information for MIMO may comprise eight bits $cqi_0$ through $cqi_7$.

The ten information bits $a_0$ through $a_9$ for CQI information for two cells may be encoded with a (20, 10) block code to obtain a codeword, as follows:

CQI bits may be more valuable in selecting a suitable transport format. For cell 1, the MSB $cqi1_4$ may be mapped to bit $a_9$ having the best protection, and the LSB $cqi1_0$ may be mapped to bit $a_6$ having the worst protection. For cell 2, the MSB $cqi2_4$ may be mapped to bit $a_4$ having the best protection, and the LSB $cqi2_0$ may be mapped to bit $a_2$ having the worst protection.

TABLE 6

Second Mapping of CQI Information to Information Bits

| | Info bits for HS-DPCCH | | | | | | | | | |
|---|---|---|---|---|---|---|---|---|---|---|
| | $a_0$ | $a_1$ | $a_2$ | $a_3$ | $a_4$ | $a_5$ | $a_6$ | $a_7$ | $a_8$ | $a_9$ |
| Protection Rank | 8 | 7 | 9 | 6 | 5 | 4 | 10 | 3 | 2 | 1 |
| CQI info bits for cell 1 | | | | | | $cqi1_1$ | $cqi1_0$ | $cqi1_2$ | $cqi1_3$ | $cqi1_4$ |
| CQI info bits for cell 2 | $cqi2_1$ | $cqi2_2$ | $cqi2_0$ | $cqi2_3$ | $cqi2_4$ | | | | | |

In general, the bits of CQI information for each cell may be mapped to the information bits in natural order (e.g., $cqi_k$ may be mapped to $a_k$, as shown in Table 5) or in permuted order (e.g., as shown in Table 6). Mapping in natural order may simplify implementation. Mapping in permuted order may improve performance when the block code provides unequal protection for different information bits.

In another design, CQI information for two cells in DC-HSDPA may be sent on the HS-DPCCH with one channelization code for each cell. In this design, the five bits of CQI information for each cell may be encoded with a (20, 5) block code to obtain 20 code bits, which may then be sent on the HS-DPCCH in two slots with the channelization code for that cell.

UE 110 may be configured to report CQI information in every feedback cycle covering Q TTIs, where in general $Q \geq 1$. UE 110 may send the CQI information in different manners depending on whether the single-code HS-DPCCH or dual-code HS-DPCCH is used for DC-HSDPA.

FIG. 4A shows a design of sending CQI information for two cells with the single-code HS-DPCCH for feedback cycle=1. In each TTI, CQI information for two cells 1 and 2 may be multiplexed (e.g., as shown in Table 5) and sent on the HS-DPCCH with a single channelization code. CQIm(n) denotes CQI information for cell m in TTI n.

FIG. 4B shows a design of sending CQI information for two cells with the dual-code HS-DPCCH for feedback cycle=1. In each TTI, CQI information for each cell may be sent on the HS-DPCCH with the channelization code for that cell.

Figure 5A:
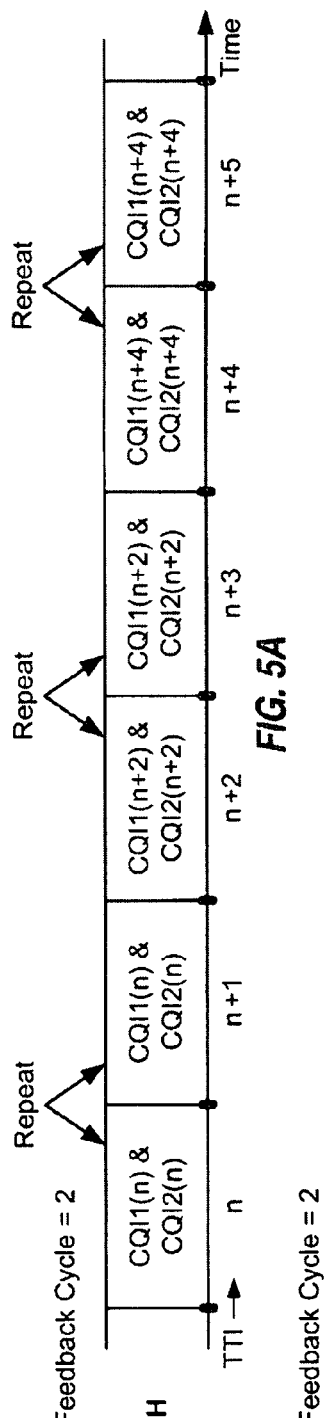

FIG. 5A shows a design of sending CQI information for two cells with the single-code HS-DPCCH for feedback cycle=2. In each feedback cycle of two TTIs, CQI information for two cells 1 and 2 may be multiplexed and sent on the HS-DPCCH with a single channelization code in each of the two TTIs. The CQI information may thus be repeated to improve reliability.

Figure 5B:
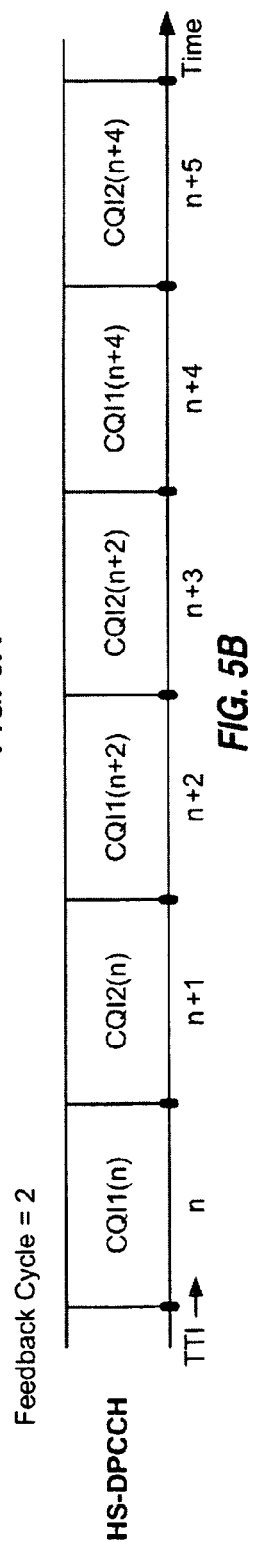

FIG. 5B shows a design of sending CQI information for two cells with the dual-code HS-DPCCH for feedback cycle=2. In each feedback cycle of two TTIs, CQI information for cell 1 may be sent on the HS-DPCCH with a channelization code (e.g., C1) in the first TTI, and CQI information for cell 2 may be sent on the HS-DPCCH with the same channelization code in the next TTI. The CQI information for cells 1 and 2 may thus be sent in different TTIs with only one channelization code.

Figure 6A:
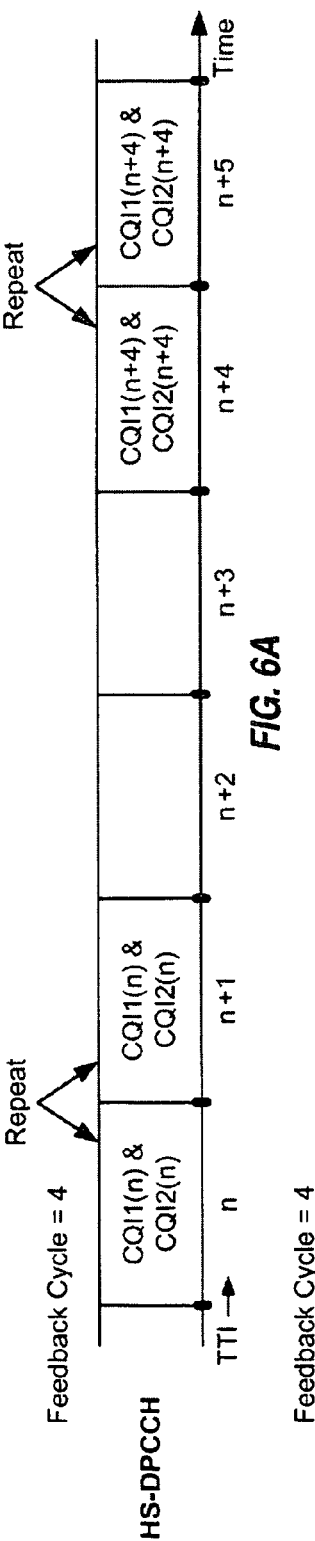

FIG. 6A shows a design of sending CQI information for two cells with the single-code HS-DPCCH for feedback cycle=4. In each feedback cycle of four TTIs, CQI information for two cells 1 and 2 may be multiplexed and sent on the HS-DPCCH with a single channelization code in each of the first two TTIs, and no information may be sent in the last two TTIs. The CQI information may thus be repeated to improve reliability.

Figure 6B:
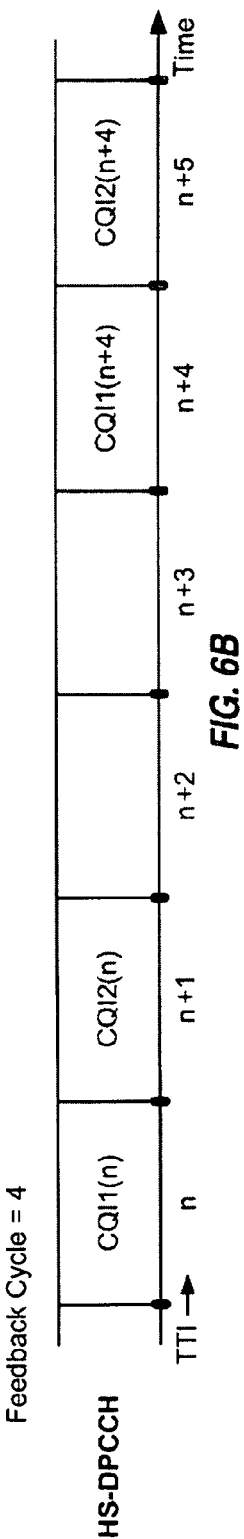

FIG. 6B shows a design of sending CQI information for two cells with the dual-code HS-DPCCH for feedback cycle=4. In each feedback cycle of four TTIs, CQI information for cell 1 may be sent on the HS-DPCCH with a channelization code (e.g., C1) in the first TTI, CQI information for cell 2 may be sent on the HS-DPCCH with the same channelization code in the next TTI, and no information may be sent in the last two TTIs. The CQI information for cells 1 and 2 may thus be sent in different TTIs with only one channelization code.

UE 110 may send the HS-DPCCH at transmit power of P for HSDPA from a single cell. UE 110 may send the HS-DPCCH at higher transmit power (e.g., 2P) for DC-HSDPA from two cells in order to account for more control information being sent on the HS-DPCCH and provide the desired reliability for the control information.

Computer simulations were performed to measure performance of the single-code HS-DPCCH and the dual-code HS-DPCCH. The computer simulations indicate that decoding performance for ACK information may be improved with the single-code HS-DPCCH. This may be due to the single-code HS-DPCCH using signaling values of '1' and '−1' and the dual-code HS-DPCCH using signaling values of '1', '−1' and '0'. The computer simulations also indicate that decoding performance for CQI information may be improved with the single-code HS-DPCCH due to joint encoding of CQI information for two cells.

Figure 7:
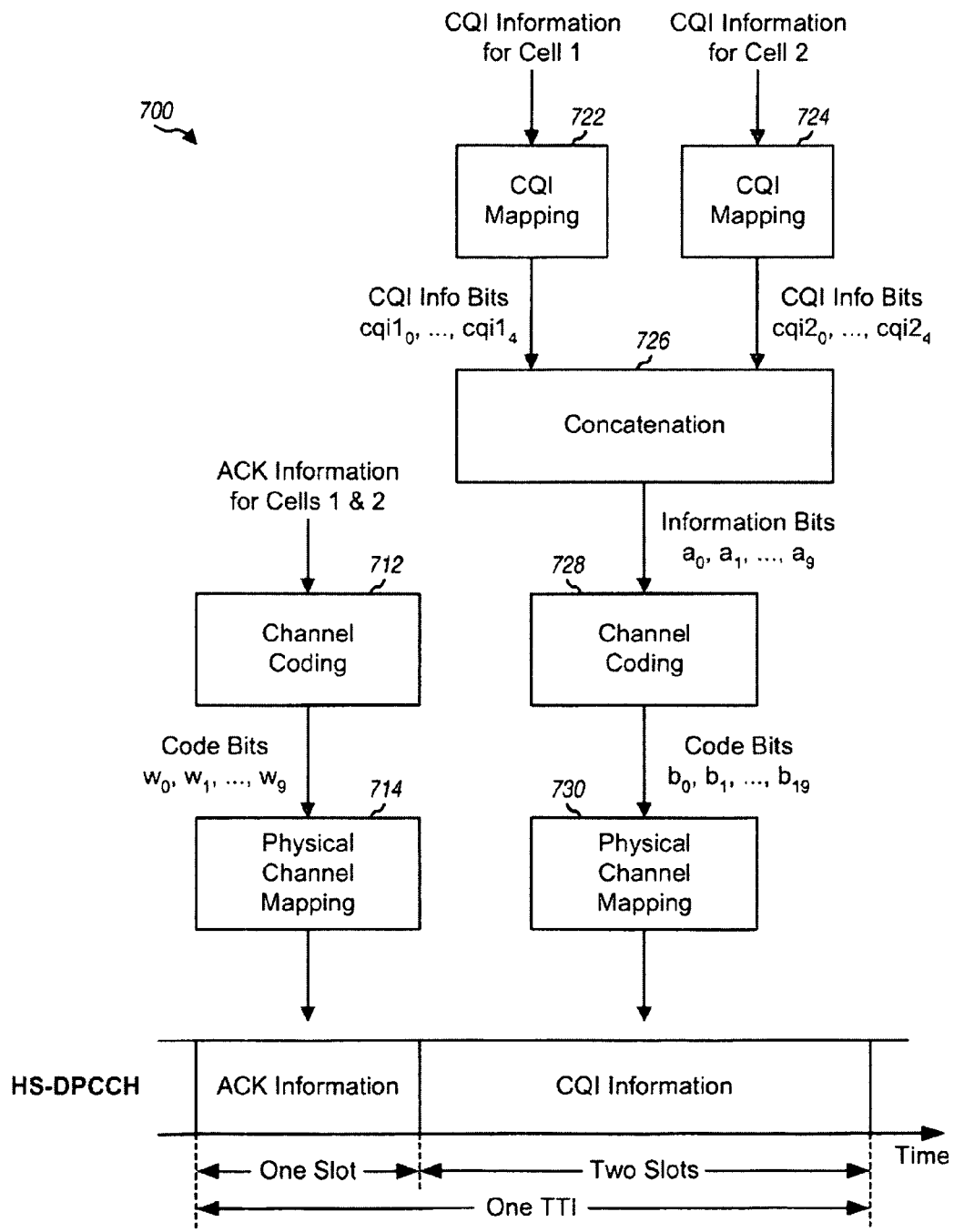
FIG. 7 shows a processing unit for sending ACK and CQI information.

FIG. 7 shows a design of a processing unit 700 for ACK and CQI information for two cells in DC-HSDPA. In a given TTI, ACK information may be sent in the first slot of the TTI, and CQI information may be sent in the second and third slots of the TTI.

For ACK information, a channel coding unit 712 may encode ACK information for cells 1 and 2 (e.g., based on the codebook shown in Table 2, 3, or 4 or some other codebook) and generate ten code bits $w_0$ through $w_9$. A physical channel mapping unit 714 may spread the ten code bits with the channelization code for the HS-DPCCH to obtain spread symbols. Unit 714 may then scale the spread symbols based on the transmit power for the HS-DPCCH and may send the scaled symbols in the first slot of the TTI.

For CQI information, a CQI mapping unit 722 may receive and map CQI information (e.g., an SINR estimate) for cell 1 to five CQI information bits $cqi1_0$ through $cqi1_4$. A CQI mapping unit 724 may receive and map CQI information for cell 2 to five CQI information bits $cqi2_0$ through $cqi2_4$. A concatenation unit 726 may concatenate the CQI information bits for cells 1 and 2 (e.g., as shown in Table 5) and provide ten information bits $a_0$ through $a_9$. A channel coding unit 728 may encode the ten information bits from unit 726, e.g., as shown in equation (1), and generate 20 code bits $b_0$ through $b_{19}$. A physical channel mapping unit 730 may spread the 20 code bits with the channelization code for the HS-DPCCH to obtain spread symbols. Unit 730 may then scale the spread symbols and send the scaled symbols in the second and third slots of the TTI.

In general, any number of ACK information bits and any number of CQI information bits may be sent on the HS-DPCCH. A suitable block code may be used for ACK information based on the number of ACK information bits (or levels L). A suitable block code may also be used for CQI information based on the number of CQI information bits. The transmit power of the HS-DPCCH may be scaled based on the amount of ACK and CQI information to send in order to achieve the desired decoding performance at Node B 120.

In yet another aspect, a dynamic switching mode of operation may be used, e.g., when UE 110 is operating in a power headroom limited region. In such a scenario, UE 110 may not have sufficient transmit power to send feedback information for two cells in DC-HSDPA. UE 110 may be configured with a CQI feedback cycle greater than one, e.g., a feedback cycle of 2, 4, etc. Node B 120 may send an HS-SCCH order to direct UE 110 to enter the dynamic switching mode. In response to the HS-SCCH order, UE 110 may send feedback information for two cells on the HS-DPCCH with one channelization code. If UE 110 was operating with the single-code HS-DPCCH, then UE 110 may continue to use the single channelization code for the HS-DPCCH. If UE 110 was operating with the dual-code HS-DPCCH, then UE 110 may select one channelization code (e.g., C1) for the HS-DPCCH and may disable the other channelization code (e.g., C2).

Figure 8:
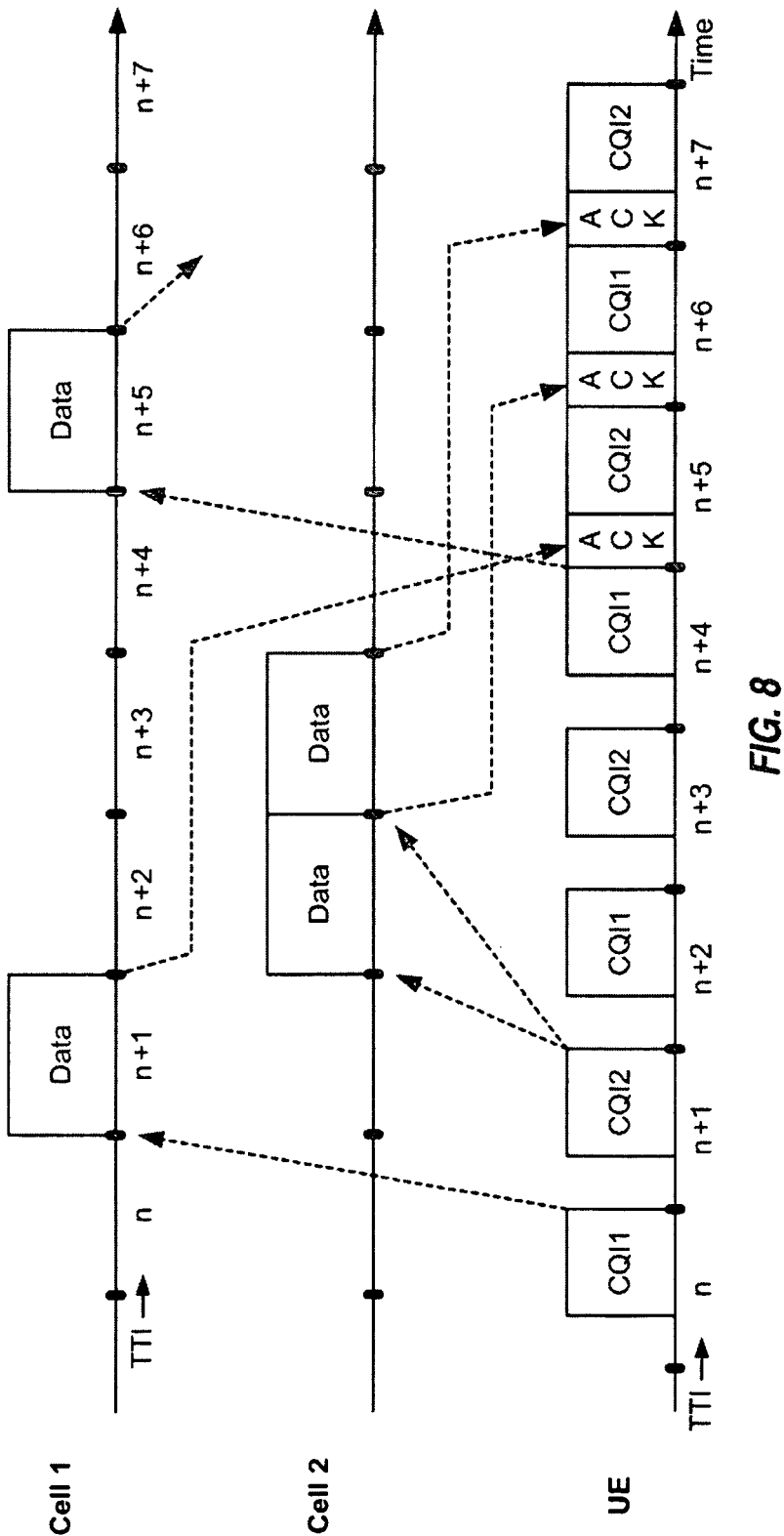
FIG. 8 shows operation of a UE in a dynamic switching mode.

FIG. 8 shows operation of UE 110 in the dynamic switching mode in accordance with one design. UE 110 may periodically measure the downlink of both cells 1 and 2. UE 110 may send CQI information for at most one cell in each TTI, and may alternate between the two cells in different TTIs. In the example shown in FIG. 8, the feedback cycle is 2, and UE 110 may send CQI information for one cell in even-numbered TTIs and may send CQI information for the other cell in odd-numbered TTIs. A CQI time offset may be signaled to indicate which TTIs to use to send the CQI information for each cell.

In the design shown in FIG. 8, UE 110 may be scheduled for data transmission by at most one cell (which is referred to as the active cell) in any given TTI. The active cell may send control information on the HS-SCCH and may send data on the HS-PDSCH to UE 110. UE 110 may process the HS-SCCHs from both cells in each TTI and may process the HS-PDSCH from the cell whose control information is detected. UE 110 may then determine ACK information for the active cell and may send the ACK information on the HS-DPCCH with the selected channelization code. In the example shown in FIG. 8, cell 1 may send data to UE 110 in downlink TTI n+1, and UE 110 may send ACK information for the data from cell 1 in uplink TTI n+5. Cell 2 may send data to UE 110 in downlink TTIs n+2 and n+3, and UE 110 may send ACK information for the data from cell 2 in uplink TTIs n+6 and n+7, respectively.

The dynamic switching mode may allow UE 110 to receive downlink data transmission from the cell with a better downlink while constraining uplink transmission to one channelization code, which may improve link budget when UE 110 is operating in a power headroom limited region.

In another design of the dynamic switching mode, UE 110 may send CQI information for two cells in different TTIs, e.g., as shown in FIG. 8. However, UE 110 may be scheduled for data transmission by up to two cells in a given TTI. Each active cell may send control information on the HS-SCCH and may send data on the HS-PDSCH to UE 110. UE 110 may process the HS-SCCHs from both cells in each TTI and may process the HS-PDSCH from each cell whose control information is detected. UE 110 may determine ACK information for the two cells. In one design, UE 110 may send the ACK information for both cells on the HS-DPCCH with one channelization code. In this design, the ACK information for both cells may be encoded, e.g., as shown in Table 2 or 3. In another design, the ACK information for each cell may be sent on the HS-DPCCH with the channelization code for that cell. In this design, the ACK information for each cell may be encoded, e.g., as shown in Table 4. Each cell may retransmit pending data or transmit new data based on the ACK information for that cell. If both cells transmit data to UE 110 but UE 110 receives data from only one cell (e.g., the data from the other cell was missed), then both cells may retransmit data to UE 110.

Figure 9:
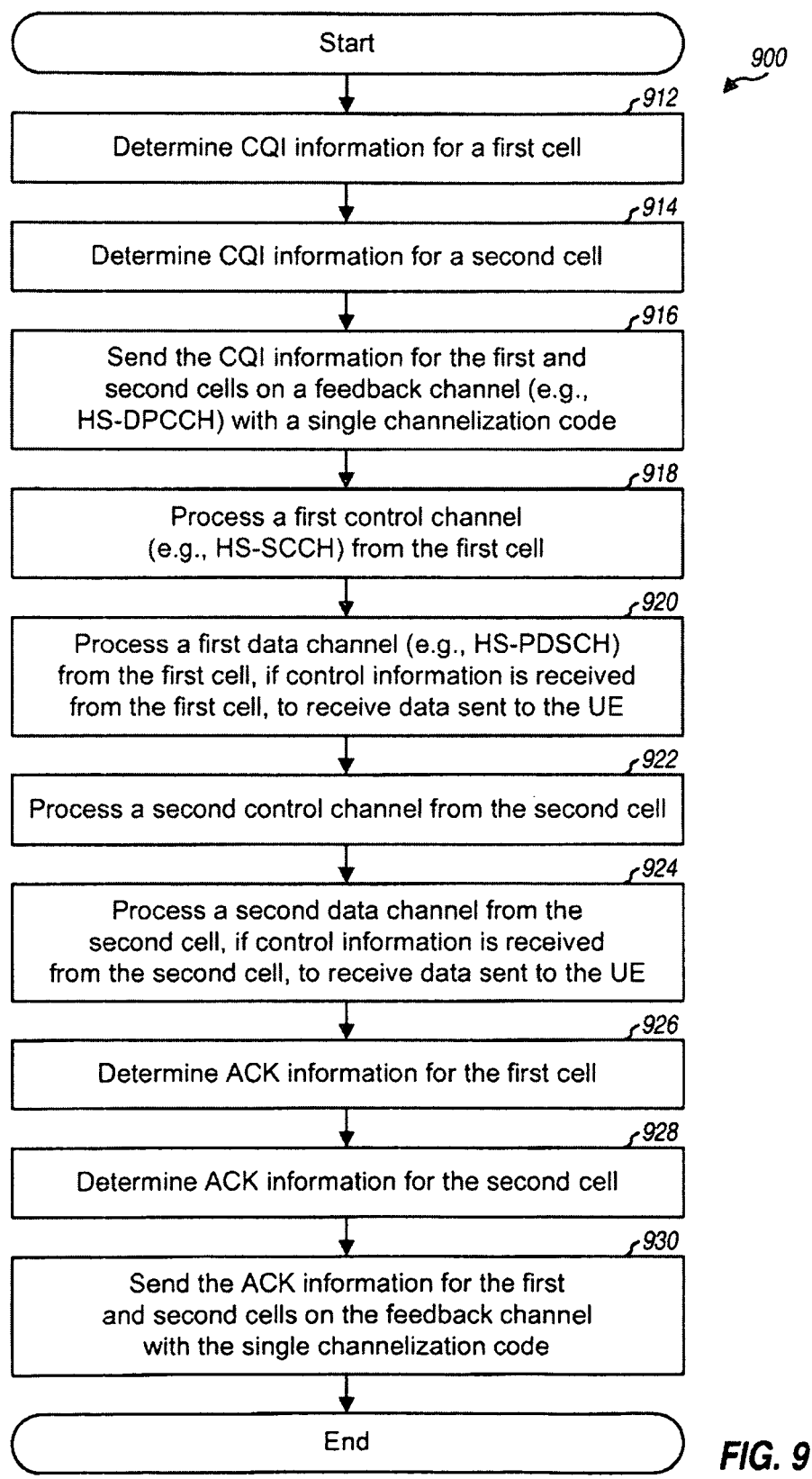
FIG. 9 shows a process for sending feedback information.

FIG. 9 shows a design of a process 900 for sending feedback information with a single channelization code. Process 900 may be performed by a UE (as described below) or by some other entity. The UE may determine CQI information for a first cell (block 912) and may determine CQI information for a second cell (block 914). The UE may send the CQI information for the first and second cells on a feedback channel (e.g., HS-DPCCH) with a single channelization code (e.g., an OVSF code) (block 916). The UE may send the CQI information for the two cells in a single TTI when configured with a feedback cycle of one (e.g., as shown in FIG. 4A) and in each of multiple TTIs when configured with a feedback cycle greater than one (e.g., as shown in FIG. 5A or 6A).

The UE may process a first control channel (e.g., the HS-SCCH) from the first cell to detect for control information sent to the UE (block 918). If control information is received from the first cell, then the UE may process a first data channel (e.g., the HS-PDSCH) from the first cell to receive data sent to the UE (block 920). The UE may process a second control channel from the second cell to detect for control information sent to the UE (block 922). If control information is received from the second cell, then the UE may process a second data channel from the second cell to receive data sent to the UE (block 924).

The UE may determine ACK information for the first cell, e.g., based on processing results for the first data and control channels from the first cell (block 926). The UE may determine ACK information for the second cell, e.g., based on processing results for the second data and control channels from the second cell (block 928). The UE may send the ACK information for the first and second cells on the feedback channel with the single channelization code (block 930).

In one design, the UE may obtain ACK, NACK, or DTX for each cell based on the processing results for the data and control channels from that cell. The UE may encode the ACK information for the first and second cells based on a block code to obtain a codeword. In one design, the block code may implement a codebook comprising (i) two codewords for ACK or NACK for the first cell and DTX for the second cell, (ii) four codewords for four combinations of ACK and NACK for the first and second cells, and (iii) two codewords for ACK or NACK for the second cell and DTX for the first cell, e.g., as shown in Table 2 or 3. The codebook may further comprise two codewords for a preamble and a postamble for the feedback channel, e.g., as shown in Table 3. The codebook may comprise all or a subset of the codewords used for sending ACK information for a MIMO transmission. The UE may send the codeword on the feedback channel with the single channelization code.

In one design, the UE may send the ACK information for the first and second cells on one branch of the feedback channel with the single channelization code. In another design, the UE may send the ACK information for the first cell on the I branch of the feedback channel with the channelization code and may send the ACK information for the second cell on the Q branch of the feedback channel with the same channelization code.

Figure 10:
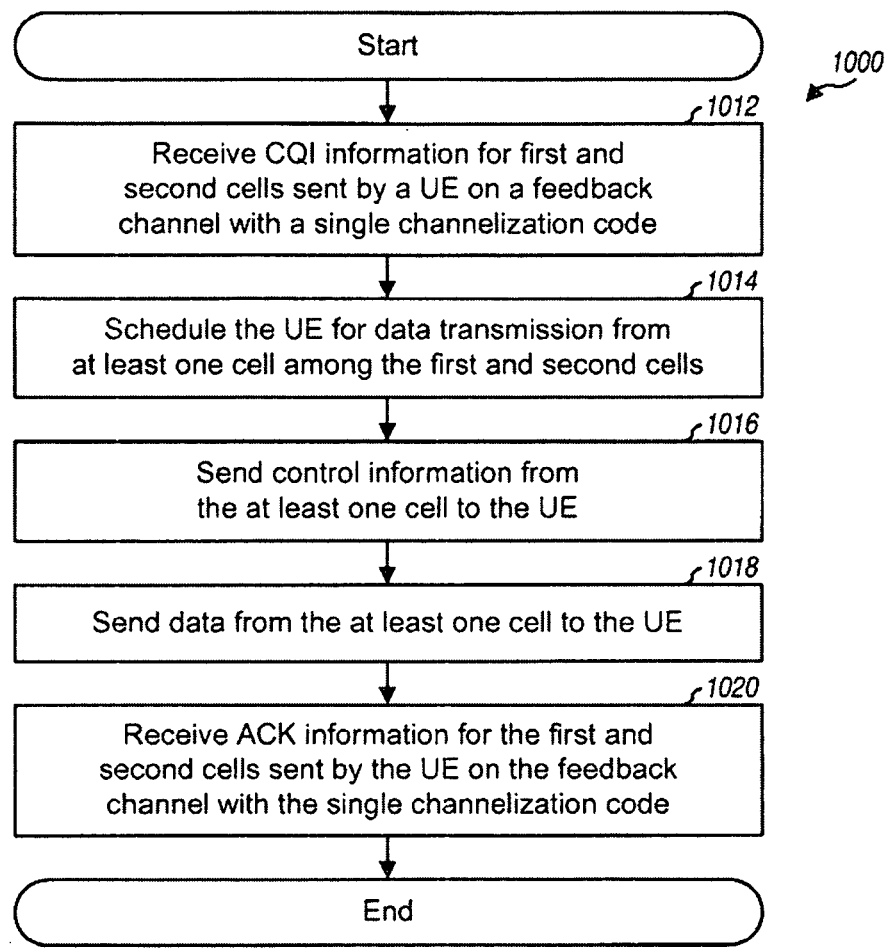
FIG. 10 shows a process for receiving feedback information.

FIG. 10 shows a design of a process 1000 for receiving feedback information sent with a single channelization code. Process 1000 may be performed by a Node B (as described below) and/or by some other network entity. The Node B may receive CQI information for first and second cells sent by a UE on a feedback channel with a single channelization code (block 1012). The Node B may schedule the UE for data transmission from at least one cell among the first and second cells (block 1014). The Node B may send control information from the at least one cell to the UE (block 1016). The Node B may also send data from the at least one cell to the UE (block 1018). The Node B may select a transport format for each cell based on the CQI information for that cell. The Node B may send data from each cell in accordance with the transport format selected for that cell.

The Node B may receive ACK information for the first and second cells sent by the UE on the feedback channel with the single channelization code (block 1020). In one design, the Node B may decode a transmission received on the feedback channel based on a block code to obtain a codeword sent by the UE for the ACK information. The Node B may then obtain ACK, NACK, or DTX for each cell based on the codeword.

Figure 11:
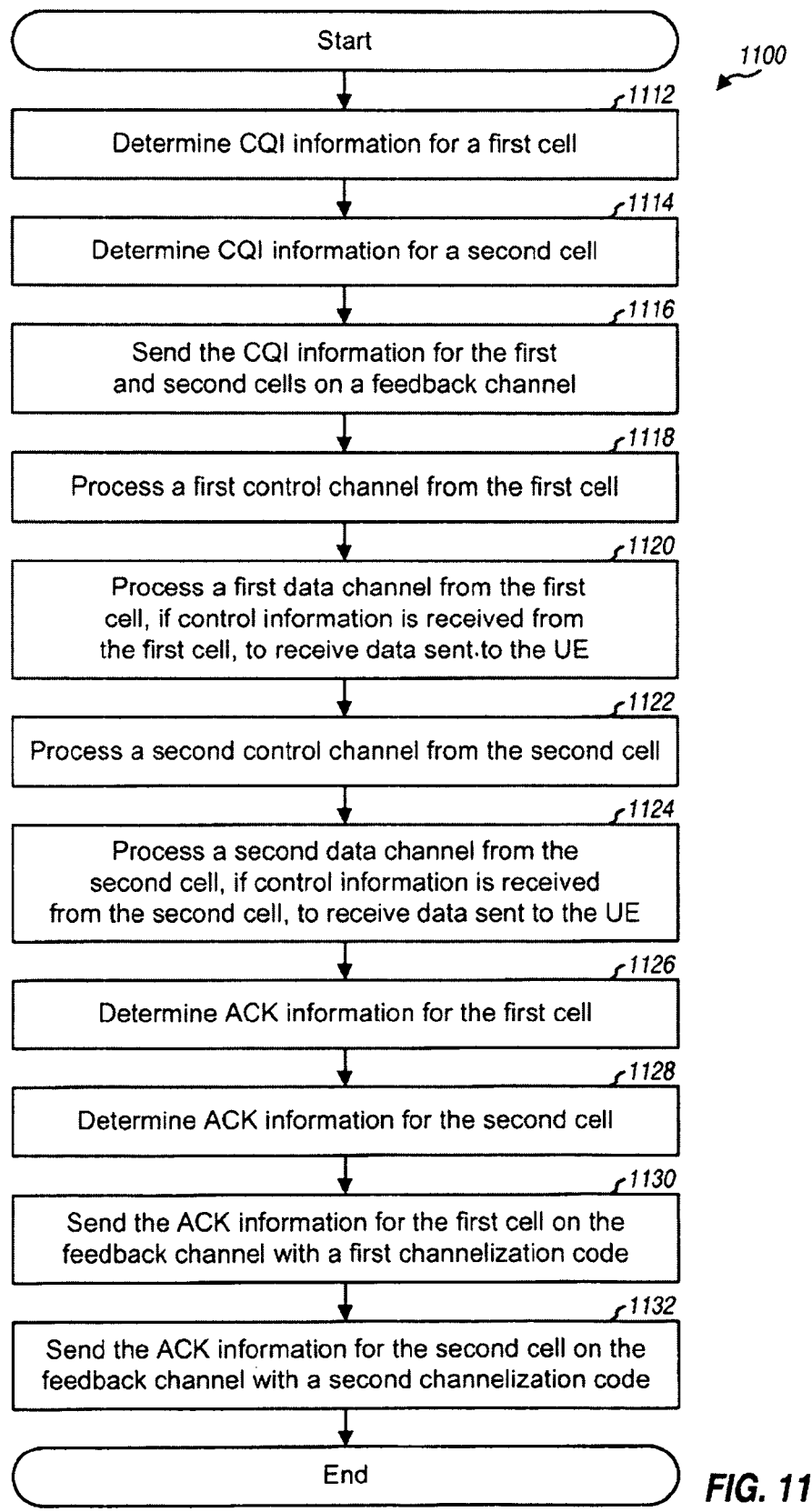
FIG. 11 shows another process for sending feedback information.

FIG. 11 shows a design of a process 1100 for sending feedback information with multiple channelization codes. Process 1100 may be performed by a UE (as described below) or by some other entity. The UE may determine CQI information for a first cell (block 1112) and may determine CQI information for a second cell (block 1114). The UE may send the CQI information for the first and second cells on a feedback channel (block 1116). In one design, the UE may send the CQI information for the first and second cells on the feedback channel with first and second channelization codes, respectively, in a single TTI, e.g., as shown in FIG. 4B. In another design, the UE may send the CQI information for the first and second cells on the feedback channel with one channelization code in different TTIs, e.g., as shown in FIG. 5B or 6B.

The UE may process a first control channel from the first cell to detect for control information sent to the UE (block 1118). If control information is received from the first cell, then the UE may process a first data channel from the first cell to receive data sent to the UE (block 1120). The UE may process a second control channel from the second cell to detect for control information sent to the UE (block 1122). If control information is received from the second cell, then the UE may process a second data channel from the second cell to receive data sent to the UE (block 1124)

The UE may determine ACK information for the first cell, e.g., based on processing results for the first data and control channels from the first cell (block 1126). The UE may determine ACK information for the second cell, e.g., based on processing results for the second data and control channels from the second cell (block 1128). The UE may send the ACK information for the first cell on the feedback channel with a first channelization code (block 1130). The UE may send the ACK information for the second cell on the feedback channel with a second channelization code (block 11132).

In one design, the UE may obtain ACK, NACK, or DTX for each cell based on the processing results for the data and channels from that cell. The UE may encode the ACK information for each cell based on a block code to obtain a codeword for the cell. The block code may implement a codebook comprising a first codeword for ACK, a second codeword for NACK, and a third codeword for DTX, e.g., as shown in Table 4. The UE may send the codewords for the first and second cells on the feedback channel with the first and second channelization codes, respectively.

Figure 12:
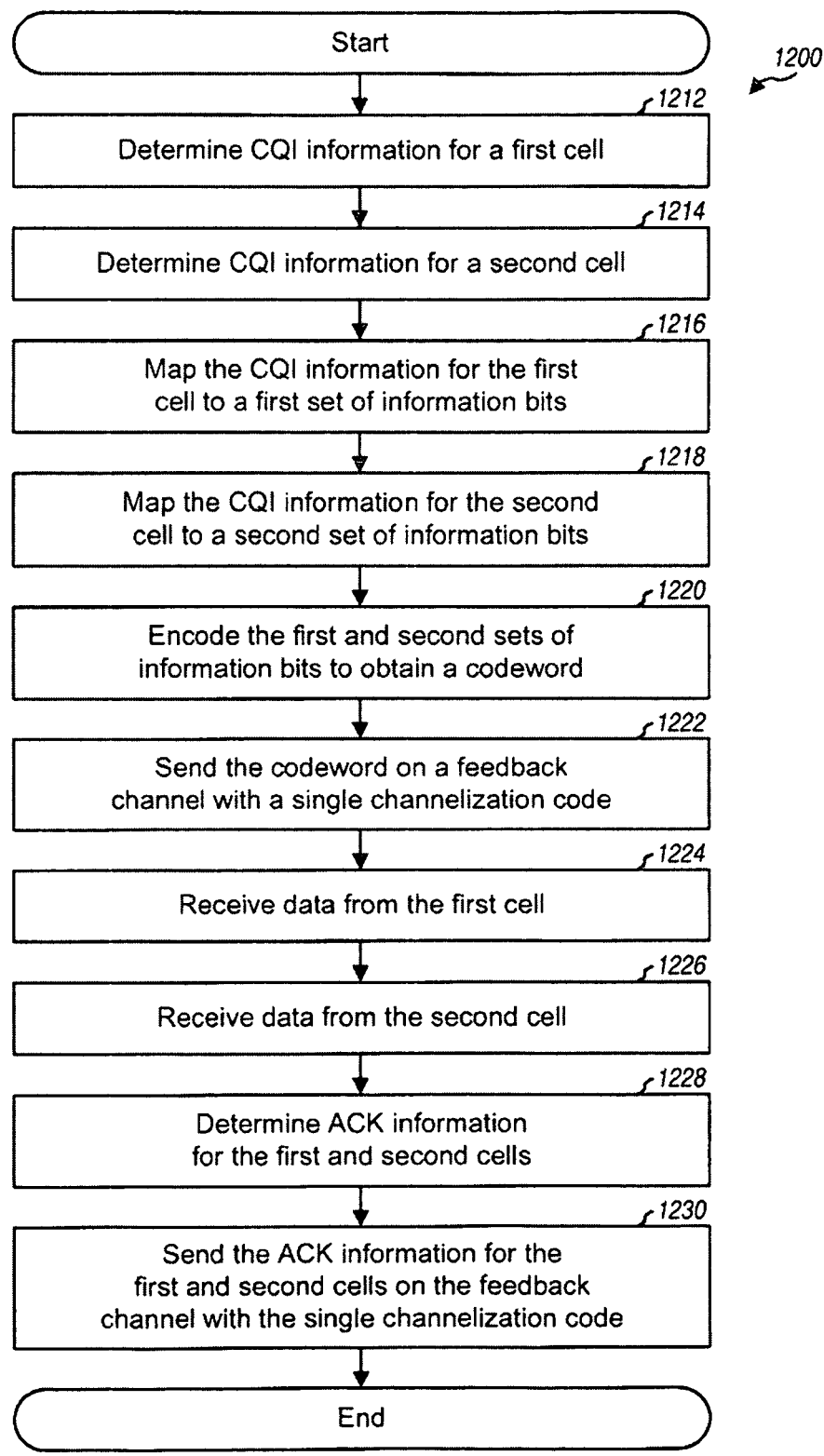
FIG. 12 shows a process for sending CQI information.

FIG. 12 shows a design of a process 1200 for sending CQI information with a single channelization code. Process 1200 may be performed by a UE (as described below) or by some other entity. The UE may determine CQI information for a first cell (block 1212) and may determine CQI information for a second cell (block 1214). The UE may map the CQI information for the first cell to a first set of information bits, e.g., bits $a_5$ to $a_9$ (block 1216) and may map the CQI information for the second cell to a second set of information bits, e.g., bits $a_0$ to $a_4$ (block 1218). The UE may map the bits of the CQI information for each cell to information bits in natural order (e.g., as shown in Table 5) or in permuted order (e.g., as shown in Table 6). The UE may encode the first and second sets of information bits to obtain a codeword (block 1220) and may send the codeword on a feedback channel with a single channelization code (block 1222).

The UE may receive data sent by the first cell in accordance with a first transport format selected based on the CQI information for the first cell (block 1224). The UE may receive data sent by the second cell in accordance with a second transport format selected based on the CQI information for the second cell (block 1226). The UE may determine ACK information for the first and second cells (block 1228) and may send the ACK information on the feedback channel with the single channelization code (block 1230).

Figure 13:
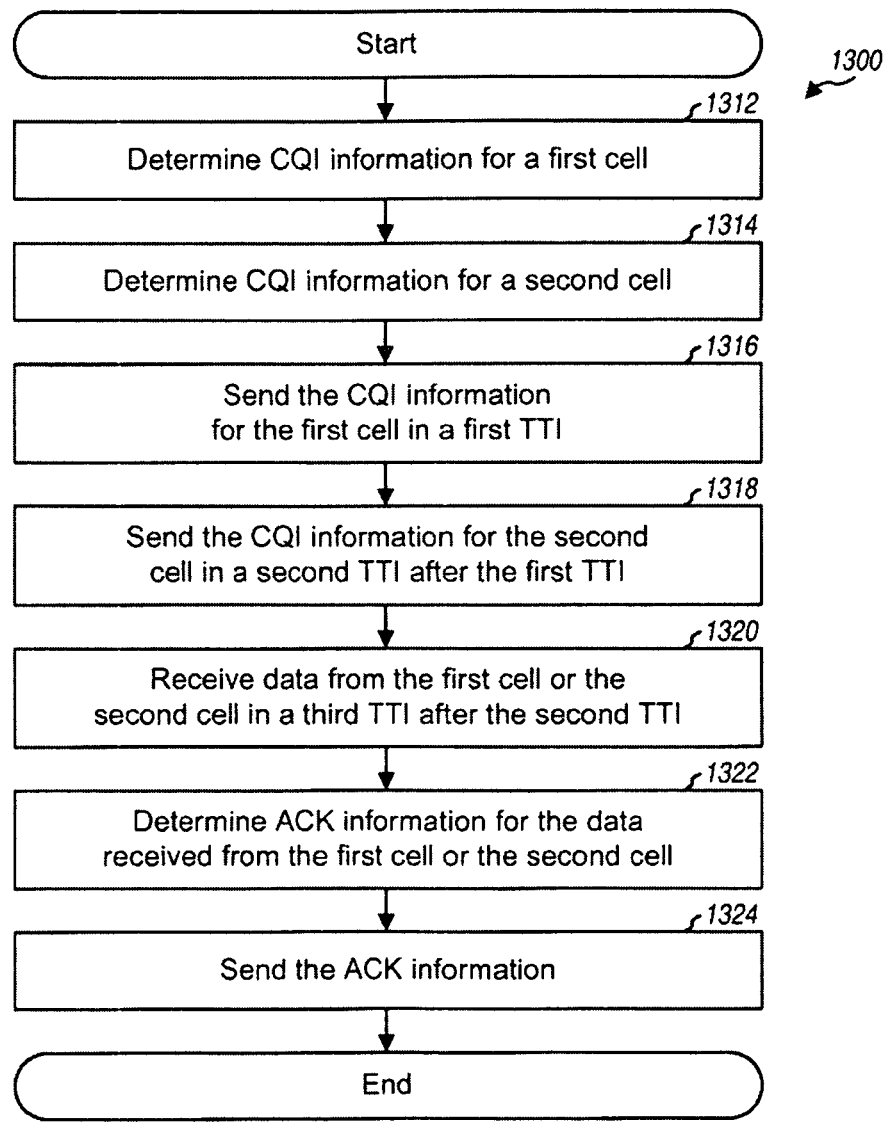
FIG. 13 shows a process of operating a UE.

FIG. 13 shows a design of a process 1300 for operating a UE. The UE may determine CQI information for a first cell (block 1312) and may determine CQI information for a second cell (block 1314). The UE may send the CQI information for the first cell in a first TTI (block 1316) and may send the CQI information for the second cell in a second TTI after the first TTI (block 1318). The UE may send the CQI information for the two cells on a feedback channel with a single channelization code.

The UE may receive data from the first cell or the second cell in a third TTI after the second TTI (block 1320). The UE may receive an order to operate in a dynamic switching mode and may then receive data from at most one cell in any given TTI while operating in the dynamic switching mode. The UE may determine ACK information for the data received from the first cell or the second cell (block 1322) and may send the ACK information on the feedback channel with the single channelization code (block 1324).

For clarity, much of the description above covers two cells. The techniques described herein may also be used for more than two cells. The techniques may further be used for data transmission on multiple carriers from a single cell or different cells. In general, the techniques may be used for data transmission on any number of links, where a link may correspond to a cell, a carrier, or some other channel.

Figure 14:
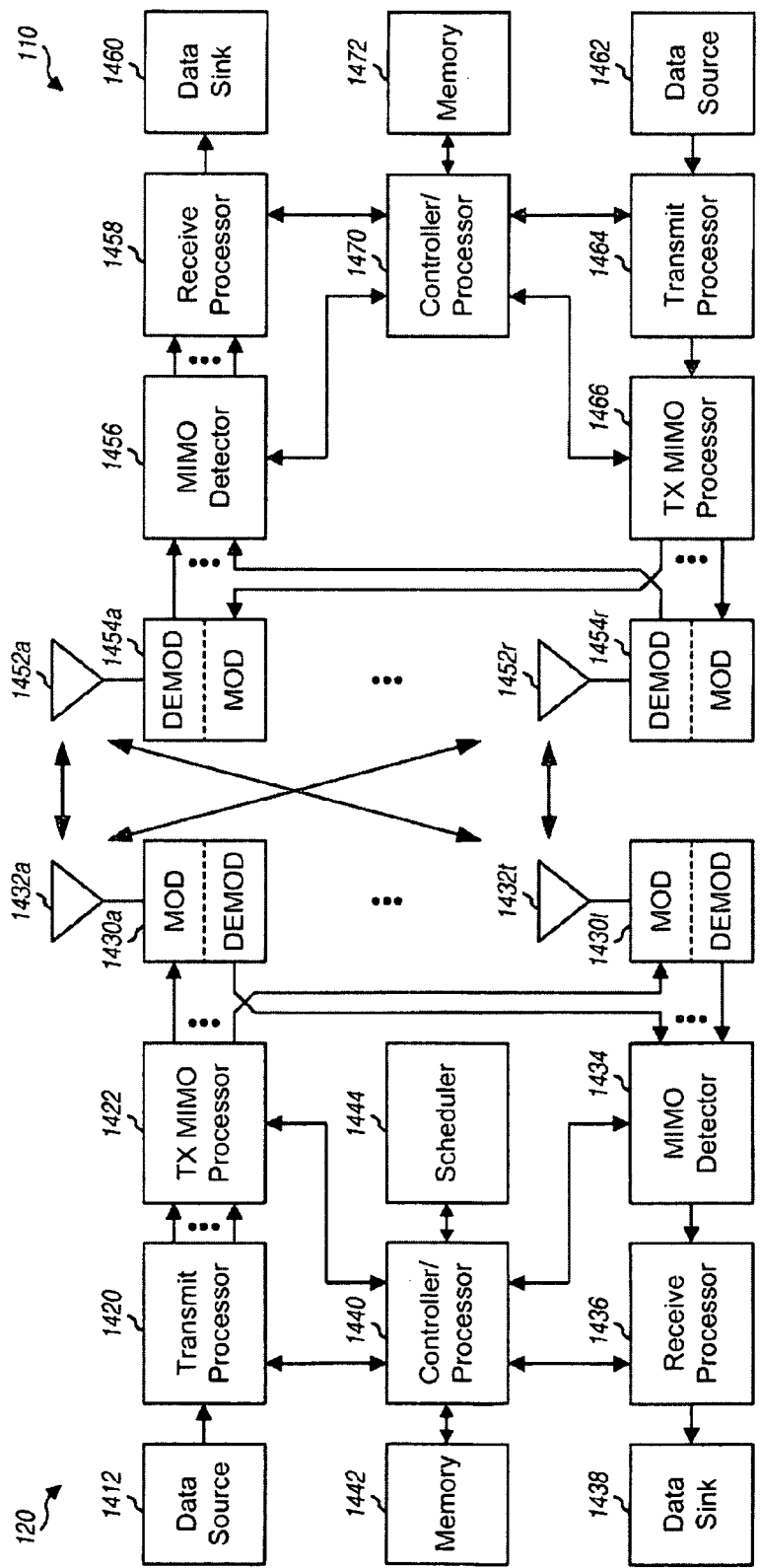
FIG. 14 shows a block diagram of a UE and a Node B.

FIG. 14 shows a block diagram of a design of UE 110 and Node B 120 in FIG. 1. Node B 120 may be equipped with T antennas 1432a through 1432t, and UE 110 may be equipped with R antennas 1452a through 1452r, where in general $T \geq 1$ and $R \geq 1$. Node B 120 may support multiple cells, and each cell may send data to one or more UEs in each TTI.

At Node B 120, a transmit processor 1420 may receive data for one or more UEs from a data source 1412, process (e.g., encode and modulate) the data for each UE, and provide data symbols for all UEs. Transmit processor 1420 may also receive control information from a controller/processor 1440, process the control information, and provide control symbols.

Transmit processor 1420 may also generate pilot symbols and may multiplex the pilot symbols with the data symbols and the control symbols. A MIMO processor 1422 may process (e.g., precode) the symbols from transmit processor 1420 (if applicable) and provide T output symbol streams to T modulators (MOD) 1430a through 1430t. Each modulator 1430 may process its output symbol stream (e.g., for CDMA) to obtain an output sample stream. Each modulator 1430 may further condition (e.g., convert to analog, filter, amplify, and upconvert) its output sample stream to generate a downlink signal. T downlink signals from modulators 1430a through 1430t may be transmitted via T antennas 1432a through 1432t, respectively.

At UE 110, antennas 1452a through 1452r may receive the downlink signals from Node B 120. Each antenna 1452 may provide a received signal to an associated demodulator (DEMOD) 1454. Each demodulator 1454 may condition (e.g., filter, amplify, downconvert, and digitize) its received signal to obtain input samples and may further process the input samples to obtain received symbols. A MIMO detector 1456 may perform MIMO detection on the received symbols from all R demodulators 1454a through 1454r and provide detected symbols. A receive processor 1458 may process (e.g., demodulate and decode) the detected symbols, provide decoded data for UE 110 to a data sink 1460, and provide decoded control information to a controller/processor 1470.

At UE 110, data from a data source 1462 and feedback information (e.g., ACK and/or CQI information) from controller/processor 1470 may be processed by a transmit processor 1464 and precoded by a MIMO processor 1466 (if applicable) to obtain R output symbol streams. R modulators 1454a through 1454r may process the R output symbol streams to obtain R output sample streams and may further condition the output sample streams to obtain R uplink signals, which may be transmitted via R antennas 1452a through 1452r. At Node B 120, the uplink signals from UE 110 may be received by antennas 1432a through 1432t, conditioned and processed by demodulators 1430a through 1430t, and further processed by a MIMO detector 1434 (if applicable) and a receive processor 1436 to recover the data and feedback information sent by UE 110. Receive processor 1436 may provide decoded data to a data sink 1438 and provide decoded feedback information to controller/processor 1440.

Controllers/processors 1440 and 1470 may direct the operation at Node B 120 and UE 110, respectively. Processor 1440 and/or other processors and modules at Node B 120 may perform or direct process 1000 in FIG. 10 and/or other processes for the techniques described herein. Processor 1470 and/or other processors and modules at UE 110 may perform or direct process 900 in FIG. 9, process 1100 in FIG. 11, process 1200 in FIG. 12, process 1300 in FIG. 13, and/or other processes for the techniques described herein. Memories 1442 and 1472 may store data and program codes for Node B 120 and UE 110, respectively. A scheduler 1444 may schedule UEs for data transmission on the downlink and/or uplink for each cell and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   processing a first control channel from a first cell to detect for control information sent by the first cell to a user equipment (UE);
   processing a first data channel from the first cell, if control information is received from the first cell, to receive data sent by the first cell to the UE;
   processing a second control channel from a second cell to detect for control information sent by the second cell to the UE;
   processing a second data channel from the second cell, if control information is received from the second cell, to receive data sent by the second cell to the UE;
   determining acknowledgement (ACK) information for the first cell by the UE based on processing results for the first control channel and the first data channel from the first cell;
   determining ACK information for the second cell by the UE based on processing results for the second control channel and the second data channel from the second cell; and
   sending the ACK information for the first and second cells on a feedback channel with a single channelization code.

2. The method of claim 1, wherein the determining ACK information for the first cell comprises obtaining ACK, negative acknowledgement (NACK), or discontinuous transmission (DTX) for the first cell based on processing results for data and control channels from the first cell, and wherein the determining the ACK information for the second cell comprises obtaining ACK, NACK, or DTX for the second cell based on processing results for data and control channels from the second cell.

3. The method of claim 1, further comprising:
   encoding the ACK information for the first and second cells based on a block code to obtain a codeword, and wherein the codeword is sent on the feedback channel with the single channelization code.

4. The method of claim 3, wherein the block code implements a codebook comprising two codewords for ACK or negative acknowledgement (NACK) for the first cell and discontinuous transmission (DTX) for the second cell, four codewords for four combinations of ACK and NACK for the first and second cells, and two codewords for ACK or NACK for the second cell and DTX for the first cell.

5. The method of claim 4, wherein the codebook further comprises two codewords for a preamble and a postamble for the feedback channel.

6. The method of claim 3, wherein the block code implements a codebook comprising at least a subset of a plurality of codewords used for sending ACK information for a multiple-input multiple-output (MIMO) transmission.

7. The method of claim 1, wherein the sending the ACK information for the first and second cells comprises
   sending the ACK information for the first cell on an inphase (I) branch of the feedback channel with the single channelization code, and
   sending the ACK information for the second cell on a quadrature (Q) branch of the feedback channel with the single channelization code.

8. The method of claim 1, further comprising:
   determining channel quality indication (CQI) information for the first cell;
   determining CQI information for the second cell; and
   sending the CQI information for the first and second cells on the feedback channel with the single channelization code.

9. The method of claim 8, wherein the sending the CQI information comprises
   sending the CQI information for the first and second cells in a single transmission time interval (TTI) if the UE is configured with a feedback cycle of one, and
   sending the CQI information for the first and second cells in each of multiple TTIs if the UE is configured with a feedback cycle greater than one.

10. The method of claim 1, wherein the control channel from each cell comprises a Shared Control Channel for HS-DSCH (HS-SCCH), the data channel from each cell comprises a High Speed Physical Downlink Shared Channel (HS-PDSCH), the feedback channel comprises a Dedicated Physical Control Channel for HS-DSCH (HS-DPCCH), and the channelization code comprises an orthogonal variable spreading factor (OVSF) code.

11. An apparatus for wireless communication, comprising:
    means for processing a first control channel from a first cell to detect for control information sent by the first cell to a user equipment (UE);
    means for processing a first data channel from the first cell, if control information is received from the first cell, to receive data sent by the first cell to the UE;
    means for processing a second control channel from a second cell to detect for control information sent by the second cell to the UE;
    means for processing a second data channel from the second cell, if control information is received from the second cell, to receive data sent by the second cell to the UE;
    means for determining acknowledgement (ACK) information for the first cell by the UE based on processing results for the first control channel and the first data channel from the first cell;
    means for determining ACK information for the second cell by the UE based on processing results for the second control channel and the second data channel from the second cell; and
    means for sending the ACK information for the first and second cells on a feedback channel with a single channelization code.

12. The apparatus of claim 11, wherein the means for determining the ACK information for the first cell comprises means for obtaining ACK, negative acknowledgement (NACK), or discontinuous transmission (DTX) for the first cell based on processing results for data and control channels from the first cell, and wherein the means for determining the ACK information for the second cell comprises means for obtaining ACK, NACK, or DTX for the second cell based on processing results for data and control channels from the second cell.

13. The apparatus of claim 11, further comprising:
means for encoding the ACK information for the first and second cells based on a block code to obtain a codeword for transmission on the feedback channel with the single channelization code, wherein the block code implements a codebook comprising two codewords for ACK or negative acknowledgement (NACK) for the first cell and discontinuous transmission (DTX) for the second cell, four codewords for four combinations of ACK and NACK for the first and second cells, and two codewords for ACK or NACK for the second cell and DTX for the first cell.

14. The apparatus of claim 11, further comprising:
means for determining channel quality indication (CQI) information for the first cell;
means for determining CQI information for the second cell; and
means for sending the CQI information for the first and second cells on the feedback channel with the single channelization code.

15. An apparatus for wireless communication, comprising:
at least one processor configured to:
process a first control channel from a first cell to detect for control information sent by the first cell to a user equipment (UE);
process a first data channel from the first cell, if control information is received from the first cell, to receive data sent by the first cell to the UE;
process a second control channel from a second cell to detect for control information sent by the second cell to the UE;
process a second data channel from the second cell, if control information is received from the second cell, to receive data sent by the second cell to the UE;
determine acknowledgement (ACK) information for the first cell by the UE based on processing results for the first control channel and the first data channel from the first cell;
determine ACK information for the second cell by the UE based on processing results for the second control channel and the second data channel from the second cell; and
send the ACK information for the first and second cells on a feedback channel with a single channelization code.

16. The apparatus of claim 15, wherein the at least one processor is configured to obtain ACK, negative acknowledgement (NACK), or discontinuous transmission (DTX) for the first cell based on processing results for data and control channels from the first cell, and to obtain ACK, NACK, or DTX for the second cell based on processing results for data and control channels from the second cell.

17. The apparatus of claim 15, wherein the at least one processor is configured to encode the ACK information for the first and second cells based on a block code to obtain a codeword, and to send the codeword on the feedback channel with the single channelization code, and wherein the block code implements a codebook comprising two codewords for ACK or negative acknowledgement (NACK) for the first cell and discontinuous transmission (DTX) for the second cell, four codewords for four combinations of ACK and NACK for the first and second cells, and two codewords for ACK or NACK for the second cell and DTX for the first cell.

18. The apparatus of claim 15, wherein the at least one processor is configured to determine channel quality indication (CQI) information for the first cell, to determine CQI information for the second cell, and to send the CQI information for the first and second cells on the feedback channel with the single channelization code.

19. A computer program product, comprising:
a non-transitory computer-readable medium comprising:
code for causing at least one computer to process a first control channel from a first cell to detect for control information sent by the first cell to a user equipment (UE);
code for causing the at least one computer to process a first data channel from the first cell, if control information is received from the first cell, to receive data sent by the first cell to the UE;
code for causing the at least one computer to process a second control channel from a second cell to detect for control information sent by the second cell to the UE;
code for causing the at least one computer to process a second data channel from the second cell, if control information is received from the second cell, to receive data sent by the second cell to the UE;
code for causing the at least one computer to determine acknowledgement (ACK) information for the first cell by the UE based on processing results for the first control channel and the first data channel from the first cell;
code for causing the at least one computer to determine ACK information for the second cell by the UE based on processing results for the second control channel and the second data channel from the second cell; and
code for causing the at least one computer to send the ACK information for the first and second cells on a feedback channel with a single channelization code.

20. A method for wireless communication, comprising:
sending data from at least one of first and second cells to a user equipment (UE);
receiving acknowledgement (ACK) information for the first and second cells sent by the UE on a feedback channel with a single channelization code;
receiving channel quality indication (CQI) information for the first and second cells sent by the UE on the feedback channel with the single channelization code;
scheduling the UE for data transmission from at least one cell among the first and second cells; and
selecting a transport format for each of the at least one cell based on CQI information for the cell, and wherein the sending data comprises sending data from each of the at least one cell to the UE in accordance with the transport format selected for the cell.

21. The method of claim 20, further comprising:
scheduling the UE for data transmission from at least one cell among the first and second cells; and
sending control information on a control channel from each cell scheduled to send data to the UE, and wherein the sending data comprises sending data on a data channel from each cell scheduled to send data to the UE.

22. The method of claim 20, further comprising:
decoding a transmission received on the feedback channel based on a block code to obtain a codeword sent by the UE for the ACK information; and
obtaining ACK, negative acknowledgement (NACK), or discontinuous transmission (DTX) for each of the first and second cells based on the codeword.

23. An apparatus for wireless communication, comprising:
means for sending data from at least one of first and second cells to a user equipment (UE);

means for receiving acknowledgement (ACK) information for the first and second cells sent by the UE on a feedback channel with a single channelization code;
means for receiving channel quality indication (CQI) information for the first and second cells sent by the UE on the feedback channel with the single channelization code;
means for scheduling the UE for data transmission from at least one cell among the first and second cells; and
means for selecting a transport format for each of the at least one cell based on CQI information for the cell, and wherein the means for sending data comprises means for sending data from each of the at least one cell to the UE in accordance with the transport format selected for the cell.

24. The apparatus of claim 23, further comprising:
means for scheduling the UE for data transmission from at least one cell among the first and second cells; and
means for sending control information on a control channel from each of the at least one cell to the UE, and wherein the means for sending data comprises means for sending data on a data channel from each of the at least one cell to the UE.

25. The apparatus of claim 23, further comprising:
means for decoding a transmission received on the feedback channel based on a block code to obtain a codeword sent by the UE for the ACK information; and
means for obtaining ACK, negative acknowledgement (NACK), or discontinuous transmission (DTX) for each of the first and second cells based on the codeword.

26. A method for wireless communication, comprising:
determining acknowledgement (ACK) information for a first cell by a user equipment (UE);
determining acknowledgement (ACK) information for a second cell by the UE;
sending the ACK information for the first cell on a feedback channel with a first channelization code;
sending the ACK information for the second cell on the feedback channel with a second channelization code;
encoding the ACK information for the first cell based on a block code to obtain a first codeword; and
encoding the ACK information for the second cell based on the block code to obtain a second codeword, wherein the first and second codewords are sent on the feedback channel with the first and second channelization codes, respectively, and the block code implements a codebook comprising a first codeword for ACK, a second codeword for negative acknowledgement (NACK), and a third codeword for discontinuous transmission (DTX) for a cell.

27. The method of claim 26, further comprising:
processing a first control channel from the first cell to detect for control information sent by the first cell to the UE;
processing a first data channel from the first cell, if control information is received from the first cell, to receive data sent by the first cell to the UE;
processing a second control channel from the second cell to detect for control information sent by the second cell to the UE; and
processing a second data channel from the second cell, if control information is received from the second cell, to receive data sent by the second cell to the UE, wherein the ACK information for the first cell is determined based on processing results for the first control channel and the first data channel from the first cell, and wherein the ACK information for the second cell is determined based on processing results for the second control channel and the second data channel from the second cell.

28. The method of claim 26, wherein the determining the ACK information for the first cell comprises obtaining ACK, negative acknowledgement (NACK), or discontinuous transmission (DTX) for the first cell based on processing results for data and control channels from the first cell, and wherein the determining the ACK information for the second cell comprises obtaining ACK, NACK, or DTX for the second cell based on processing results for data and control channels from the second cell.

29. The method of claim 26, further comprising:
determining channel quality indication (CQI) information for the first cell;
determining CQI information for the second cell;
sending the CQI information for the first cell on the feedback channel with the first channelization code; and
sending the CQI information for the second cell on the feedback channel with the second channelization code.

30. The method of claim 26, further comprising:
determining channel quality indication (CQI) information for the first cell;
determining CQI information for the second cell;
sending the CQI information for the first cell on the feedback channel with a selected channelization code in a first transmission time interval (TTI), the selected channelization code being the first or second channelization code; and
sending the CQI information for the second cell on the feedback channel with the selected channelization code in a second TTI after the first TTI.

31. A method for wireless communication, comprising:
determining channel quality indication (CQI) information for a first cell at a user equipment (UE);
determining CQI information for a second cell at the UE;
mapping the CQI information for the first cell to a first set of information bits comprising mapping bits of the CQI information for the first cell to information bits in the first set in natural order;
mapping the CQI information for the second cell to a second set of information bits comprising mapping bits of the CQI information for the second cell to information bits in the second set in natural order;
encoding the first and second sets of information bits to obtain a codeword; and
sending the codeword on a feedback channel with a single channelization code.

32. The method of claim 31, further comprising:
receiving data sent by the first cell in accordance with a first transport format selected based on the CQI information for the first cell;
receiving data sent by the second cell in accordance with a second transport format selected based on the CQI information for the second cell;
determining acknowledgement (ACK) information for the first and second cells; and
sending the ACK information for the first and second cells on the feedback channel with the single channelization code.

33. An apparatus for wireless communication, comprising:
means for determining channel quality indication (CQI) information for a first cell at a user equipment (UE);
means for determining CQI information for a second cell at the UE;
means for mapping the CQI information for the first cell to a first set of information bits comprising means for mapping bits of the CQI information for the first cell to information bits in the first set in natural order;
means for mapping the CQI information for the second cell to a second set of information bits comprising means for mapping bits of the CQI information for the second cell to information bits in the second set in natural order;
means for encoding the first and second sets of information bits to obtain a codeword; and
means for sending the codeword on a feedback channel with a single channelization code.

34. The apparatus of claim 33, further comprising:
means for receiving data sent by the first cell in accordance with a first transport format selected based on the CQI information for the first cell;
means for receiving data sent by the second cell in accordance with a second transport format selected based on the CQI information for the second cell;
means for determining acknowledgement (ACK) information for the first and second cells; and
means for sending the ACK information for the first and second cells on the feedback channel with the single channelization code.

35. A method for wireless communication, comprising:
determining channel quality indication (CQI) information for a first cell at a user equipment (UE);
determining CQI information for a second cell at the UE;
sending the CQI information for the first cell in a first transmission time interval (TTI);
sending the CQI information for the second cell in a second TTI after the first TTI, wherein the CQI information for the first and second cells is sent on a feedback channel with a single channelization code to the first and second cells; and
receiving data from the first cell or the second cell in a third TTI after the second TTI.

36. The method of claim 35, further comprising:
receiving an order to operate in a dynamic switching mode by the UE; and
receiving data from at most one cell among the first and second cells in each transmission time interval (TTI) while operating in the dynamic switching mode.

37. The method of claim 35, further comprising:
determining acknowledgement (ACK) information for the data received from the first cell or the second cell; and
sending the ACK information on a feedback channel with a single channelization code, and wherein the CQI information for the first and second cells is sent on the feedback channel with the single channelization code.

38. An apparatus for wireless communication, comprising:
at least one processor configured to:
determine channel quality indication (CQI) information for a first cell at a user equipment (UE);
determine CQI information for a second cell at the UE;
map the CQI information for the first cell to a first set of information bits comprising mapping bits of the CQI information for the first cell to information bits in the first set in natural order;
map the CQI information for the second cell to a second set of information bits comprising mapping bits of the CQI information for the second cell to information bits in the second set in natural order;
encode the first and second sets of information bits to obtain a codeword; and
send the codeword on a feedback channel with a single channelization code.

39. A computer program product, comprising:
a non-transitory computer-readable medium comprising:
code for causing at least one computer to determine channel quality indication (CQI) information for a first cell at a user equipment (UE);
code for causing the at least one computer to determine CQI information for a second cell at the UE;
code for causing the at least one computer to map the CQI information for the first cell to a first set of information bits comprising mapping bits of the CQI information for the first cell to information bits in the first set in natural order;
code for causing the at least one computer to map the CQI information for the second cell to a second set of information bits comprising mapping bits of the CQI information for the second cell to information bits in the second set in natural order;
code for causing the at least one computer to encode the first and second sets of information bits to obtain a codeword; and
code for causing the at least one computer to send the codeword on a feedback channel with a single channelization code.

40. An apparatus for wireless communication, comprising:
at least one processor configured to:
determine channel quality indication (CQI) information for a first cell at a user equipment (UE);
determine CQI information for a second cell at the UE;
send the CQI information for the first cell in a first transmission time interval (TTI);
send the CQI information for the second cell in a second TTI after the first TTI, wherein the CQI information for the first and second cells is sent on a feedback channel with a single channelization code to the first and second cells; and
receive data from the first cell or the second cell in a third TTI after the second TTI.

41. A computer program product, comprising:
a non-transitory computer-readable medium comprising:
code for causing at least one computer to determine channel quality indication (CQI) information for a first cell at a user equipment (UE);
code for causing the at least one computer to determine CQI information for a second cell at the UE;
code for causing the at least one computer to send the CQI information for the first cell in a first transmission time interval (TTI);
code for causing the at least one computer to send the CQI information for the second cell in a second TTI after the first TTI, wherein the CQI information for the first and second cells is sent on a feedback channel with a single channelization code to the first and second cells; and
code for causing the at least one computer to receive data from the first cell or the second cell in a third TTI after the second TTI.

42. An apparatus for wireless communication, comprising:
means for determining channel quality indication (CQI) information for a first cell at a user equipment (UE);
means for determining CQI information for a second cell at the UE;
means for sending the CQI information for the first cell in a first transmission time interval (TTI);
means for sending the CQI information for the second cell in a second TTI after the first TTI, wherein the CQI information for the first and second cells is sent on a feedback channel with a single channelization code to the first and second cells; and means for receiving data from the first cell or the second cell in a third TTI after the second TTI.

43. An apparatus for wireless communication, comprising:
at least one processor configured to:
send data from at least one of first and second cells to a user equipment (UE);
receive acknowledgement (ACK) information for the first and second cells sent by the UE on a feedback channel with a single channelization code;
receive channel quality indication (CQI) information for the first and second cells sent by the UE on the feedback channel with the single channelization code;
schedule the UE for data transmission from at least one cell among the first and second cells; and
select a transport format for each of the at least one cell based on CQI information for the cell, and wherein the sending data comprises sending data from each of the at least one cell to the UE in accordance with the transport format selected for the cell.

44. A computer program product, comprising:
a non-transitory computer-readable medium comprising:
code for causing at least one computer to send data from at least one of first and second cells to a user equipment (UE);
code for causing the at least one computer to receive acknowledgement (ACK) information for the first and second cells sent by the UE on a feedback channel with a single channelization code;
code for causing the at least one computer to receive channel quality indication (CQI) information for the first and second cells sent by the UE on the feedback channel with the single channelization code;
code for causing the at least one computer to schedule the UE for data transmission from at least one cell among the first and second cells; and
code for causing the at least one computer to select a transport format for each of the at least one cell based on CQI information for the cell, and wherein the sending data comprises sending data from each of the at least one cell to the UE in accordance with the transport format selected for the cell.

45. An apparatus for wireless communication, comprising:
at least one processor configured to:
determine acknowledgement (ACK) information for a first cell by a user equipment (UE);
determine acknowledgement (ACK) information for a second cell by the UE;
send the ACK information for the first cell on a feedback channel with a first channelization code;
send the ACK information for the second cell on the feedback channel with a second channelization code;
encode the ACK information for the first cell based on a block code to obtain a first codeword; and
encode the ACK information for the second cell based on the block code to obtain a second codeword, wherein the first and second codewords are sent on the feedback channel with the first and second channelization codes, respectively, and the block code implements a codebook comprising a first codeword for ACK, a second codeword for negative acknowledgement (NACK), and a third codeword for discontinuous transmission (DTX) for a cell.

46. An apparatus for wireless communication, comprising:
means for determining acknowledgement (ACK) information for a first cell by a user equipment (UE);
means for determining acknowledgement (ACK) information for a second cell by the UE;
means for sending the ACK information for the first cell on a feedback channel with a first channelization code;
means for sending the ACK information for the second cell on the feedback channel with a second channelization code;
means for encoding the ACK information for the first cell based on a block code to obtain a first codeword; and
means for encoding the ACK information for the second cell based on the block code to obtain a second codeword, wherein the first and second codewords are sent on the feedback channel with the first and second channelization codes, respectively, and the block code implements a codebook comprising a first codeword for ACK, a second codeword for negative acknowledgement (NACK), and a third codeword for discontinuous transmission (DTX) for a cell.

47. A computer program product, comprising:
a non-transitory computer-readable medium comprising:
code for causing at least one computer to determine acknowledgement (ACK) information for a first cell by a user equipment (UE);
code for causing the at least one computer to determine acknowledgement (ACK) information for a second cell by the UE;
code for causing the at least one computer to send the ACK information for the first cell on a feedback channel with a first channelization code;
code for causing the at least one computer to send the ACK information for the second cell on the feedback channel with a second channelization code;
code for causing the at least one computer to encode the ACK information for the first cell based on a block code to obtain a first codeword; and
code for causing the at least one computer to encode the ACK information for the second cell based on the block code to obtain a second codeword, wherein the first and second codewords are sent on the feedback channel with the first and second channelization codes, respectively, and the block code implements a codebook comprising a first codeword for ACK, a second codeword for negative acknowledgement (NACK), and a third codeword for discontinuous transmission (DTX) for a cell.

48. A method for wireless communication, comprising:
determining channel quality indication (CQI) information for a first cell at a user equipment (UE);
determining CQI information for a second cell at the UE;
mapping the CQI information for the first cell to a first set of information bits;
mapping the CQI information for the second cell to a second set of information bits;
encoding the first and second sets of information bits to obtain a codeword;
sending the codeword on a feedback channel with a single channelization code;
receiving data sent by the first cell in accordance with a first transport format selected based on the CQI information for the first cell;
receiving data sent by the second cell in accordance with a second transport format selected based on the CQI information for the second cell;
determining acknowledgement (ACK) information for the first and second cells; and
sending the ACK information for the first and second cells on the feedback channel with the single channelization code.

49. An apparatus for wireless communication, comprising:
means for determining channel quality indication (CQI) information for a first cell at a user equipment (UE);
means for determining CQI information for a second cell at the UE;
means for mapping the CQI information for the first cell to a first set of information bits;
means for mapping the CQI information for the second cell to a second set of information bits;
means for encoding the first and second sets of information bits to obtain a codeword;
means for sending the codeword on a feedback channel with a single channelization code;
means for receiving data sent by the first cell in accordance with a first transport format selected based on the CQI information for the first cell;
means for receiving data sent by the second cell in accordance with a second transport format selected based on the CQI information for the second cell;
means for determining acknowledgement (ACK) information for the first and second cells; and
means for sending the ACK information for the first and second cells on the feedback channel with the single channelization code.

50. An apparatus for wireless communication, comprising:
at least one processor configured to:
determine channel quality indication (CQI) information for a first cell at a user equipment (UE);
determine CQI information for a second cell at the UE;
map the CQI information for the first cell to a first set of information bits;
map the CQI information for the second cell to a second set of information bits;
encode the first and second sets of information bits to obtain a codeword;
send the codeword on a feedback channel with a single channelization code;
receive data sent by the first cell in accordance with a first transport format selected based on the CQI information for the first cell;
receive data sent by the second cell in accordance with a second transport format selected based on the CQI information for the second cell;
determine acknowledgement (ACK) information for the first and second cells; and
send the ACK information for the first and second cells on the feedback channel with the single channelization code.

51. A computer program product, comprising:
a non-transitory computer-readable medium comprising:
code for causing at least one computer to determine channel quality indication (CQI) information for a first cell at a user equipment (UE);
code for causing the at least one computer to determine CQI information for a second cell at the UE;
code for causing the at least one computer to map the CQI information for the first cell to a first set of information bits;
code for causing the at least one computer to map the CQI information for the second cell to a second set of information bits;
code for causing the at least one computer to encode the first and second sets of information bits to obtain a codeword;
code for causing the at least one computer to send the codeword on a feedback channel with a single channelization code;
code for causing the at least one computer to receive data sent by the first cell in accordance with a first transport format selected based on the CQI information for the first cell;
code for causing the at least one computer to receive data sent by the second cell in accordance with a second transport format selected based on the CQI information for the second cell;
code for causing the at least one computer to determine acknowledgement (ACK) information for the first and second cells; and
code for causing the at least one computer to send the ACK information for the first and second cells on the feedback channel with the single channelization code.

* * * * *